United States Patent
Mishra et al.

(10) Patent No.: US 11,528,636 B2
(45) Date of Patent: Dec. 13, 2022

(54) OPENRAN NETWORKING INFRASTRUCTURE

(71) Applicant: Parallel Wireless, Inc., Nashua, NH (US)

(72) Inventors: Rajesh Kumar Mishra, Westford, MA (US); Eugina Jordan, Leominster, MA (US); Zahid Ghadialy, Ilford (GB); Kaitki Agarwal, Westford, MA (US); Fernando Cerioni, Clinton, MA (US); Arun Prasath, Boxborough, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/168,171

(22) Filed: Feb. 4, 2021

(65) Prior Publication Data

US 2021/0306899 A1    Sep. 30, 2021

Related U.S. Application Data

(60) Provisional application No. 62/970,134, filed on Feb. 4, 2020.

(51) Int. Cl.
*H04W 28/02* (2009.01)
*H04W 28/08* (2009.01)
*H04W 88/08* (2009.01)

(52) U.S. Cl.
CPC ... *H04W 28/0268* (2013.01); *H04W 28/0975* (2020.05); *H04W 28/0983* (2020.05); *H04W 88/085* (2013.01)

(58) Field of Classification Search
None
See application file for complete search history.

(56) References Cited

U.S. PATENT DOCUMENTS 9,588,815 B1    3/2017  Mistry et al.
9,723,030 B2    8/2017  Hedman et al.
(Continued)

FOREIGN PATENT DOCUMENTS

WO    2017171647 A1    10/2017
WO    2018006985 A1    1/2018
WO    2018031057 A1    2/2018

OTHER PUBLICATIONS

Presentation Materials, IEEE 5G Summit University of Strathclyde, Glasgow, Scotland, UK. Monday May 14, 2018.
(Continued)

*Primary Examiner* — Kodzovi Acolatse
(74) *Attorney, Agent, or Firm* — Michael Y. Saji; David W. Rouille

(57) ABSTRACT

Systems, methods, and computer software are disclosed for providing an Open Radio Access Network (RAN) networking infrastructure. In one embodiment a method is disclosed, comprising: providing real-time OpenRAN controller responsible for radio connection management, mobility management, QoS management, edge services, and interference management for the quality of end user experience; and providing a non-real-time controller in communication with the real-time OpenRAN controller, the non-real-time controller providing functionality such as configuration management, device management, fault management, performance management, and lifecycle management for all network elements in a network.

15 Claims, 18 Drawing Sheets

(56) References Cited

U.S. PATENT DOCUMENTS

| | | | |
|---|---|---|---|
| 10,367,677 | B2 | 7/2019 | Parkvall et al. |
| 10,630,410 | B2 | 4/2020 | Parkvall et al. |
| 2007/0213059 | A1 | 9/2007 | Shaheen |
| 2014/0016614 | A1 | 1/2014 | Velev et al. |
| 2015/0109995 | A1 | 4/2015 | Mathai et al. |
| 2016/0156503 | A1 | 6/2016 | Rosa de Sousa Teixeira et al. |
| 2016/0234819 | A1 | 8/2016 | da Silva et al. |
| 2017/0054595 | A1 | 2/2017 | Zhang et al. |
| 2017/0289866 | A1 | 10/2017 | Wafta et al. |
| 2021/0135950 | A1* | 5/2021 | Buyukkoc .......... H04W 72/0406 |
| 2021/0160153 | A1* | 5/2021 | Akman ............... H04L 41/0816 |
| 2021/0385682 | A1* | 12/2021 | Bedekar ............ H04W 28/0215 |

OTHER PUBLICATIONS

Cisco Systems, Inc. "5G Non-standalone Solution Guide, StarOS Release 21.16." Published Nov. 15, 2019.

3rd Generation Partnership Project. "ETSI TS 123 501 V15.2.0; 5G; System Architecture for the 5G System." Published Jun. 2018. See § 4.3.3, pp. 37-40.

* cited by examiner

OPENRAN NETWORKING INFRASTRUCTURE

CROSS-REFERENCE TO RELATED APPLICATIONS

This application claims priority under 35 U.S.C. § 119(e) to U.S. Provisional Pat. App. No. 62/970,134, filed Feb. 4, 2020, titled "OpenRAN Networking Infrastructure" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Recently, with the drive to modernize and upgrade radio access network (RAN) equipment to enable 5G technology, the cellular technology ecosystem has begun to converge on the notion of separate technology vendors for providing the RAN hardware (and to some extent software) versus providing the core network hardware and software. To promote interoperability among RAN hardware vendors in the ecosystem, OpenRAN vendors have begun to discuss architectural and protocol interoperability. However, there are currently various different visions of what OpenRAN is and is not.

SUMMARY

The Parallel Wireless OpenRAN Controller enables OpenRAN solutions. OpenRAN architecture disaggregates hardware and software component functionality that reduces TCO for Customers. Virtualized RAN functions deployed on the controller on the platform, reduces complexity and simplifies network maintenance, consumes optimal resources, and reduces total cost of ownership for our customers. Leveraging the ever-growing capacity of COTS x86-based servers and a fully virtualized, hardware agnostic architecture, customers can handle the bigger workloads and stricter requirements of 5G. Parallel Wireless offers the world's first OpenRAN Controller software suite to help Mobile Operators manage and grow their multi-vendor, All-G networks, while enjoying the benefits of lower TCO compared to legacy solutions.

Methods, systems, and computer-readable medium are described for providing an Open Radio Access Network (RAN) networking infrastructure. In one embodiment a method includes providing real-time OpenRAN controller responsible for radio connection management, mobility management, QoS management, edge services, and interference management for the quality of end user experience; and providing a non-real-time controller in communication with the real-time OpenRAN controller, the non-real-time controller providing functionality such as configuration management, device management, fault management, performance management, and lifecycle management for all network elements in a network.

In another embodiment, a non-transitory computer-readable medium containing instructions for providing an Open Radio Access Network (RAN) networking infrastructure, which, when executed, cause a system to perform steps comprising: providing real-time OpenRAN controller responsible for radio connection management, mobility management, QoS management, edge services, and interference management for the quality of end user experience; and providing a non-real-time controller in communication with the real-time OpenRAN controller, the non-real-time controller providing functionality such as configuration management, device management, fault management, performance management, and lifecycle management for all network elements in a network.

In another embodiment, a system may be disclosed for providing an Open Radio Access Network (RAN) networking infrastructure, comprising: a real-time OpenRAN controller responsible for radio connection management, mobility management, QoS management, edge services, and interference management for the quality of end user experience; and a non-real-time controller in communication with the real-time OpenRAN controller, the non-real-time controller providing functionality such as configuration management, device management, fault management, performance management, and lifecycle management for all network elements in a network.

DETAILED DESCRIPTION

Figure 1:
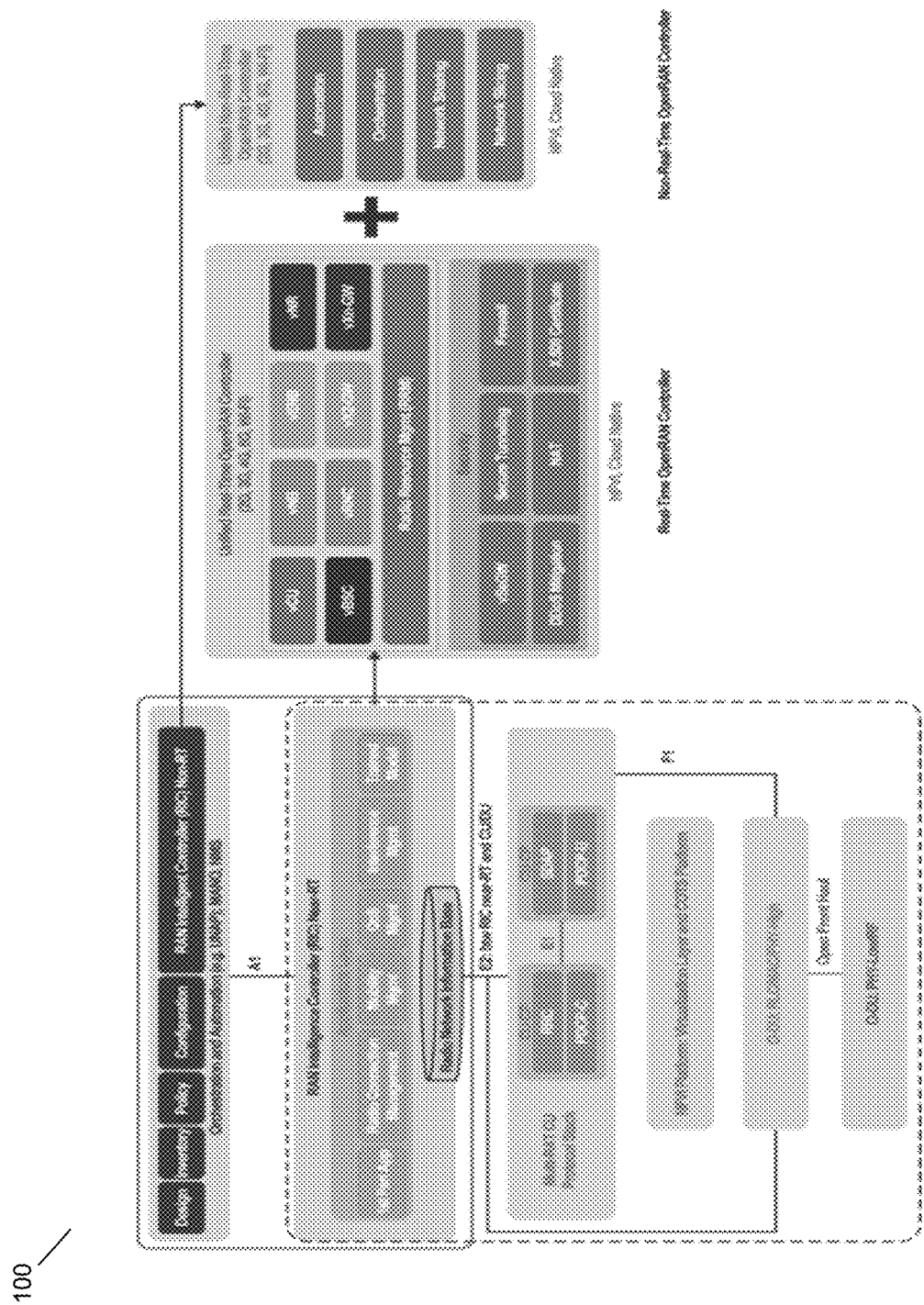
FIG. 1 is a diagram showing an OpenRAN controller, in accordance with some embodiments.

FIG. 1 is a diagram showing an OpenRAN controller 100, in accordance with some embodiments. OpenRAN Controller: This software suite is responsible for radio connection management, mobility management, QoS management, edge services, and interference management for the end user experience. Specifically, the Near-RT RIC is coupled with a Unified Real-Time OpenRAN controller (URTORC), which provides a unified real-time controller for 2G, 3G, 4G, 5G, Wi-Fi, or any combination thereof. The URTORC can provide a virtualized 2G BSC, 3G RNC, 4G eNB, X2/S1 Gateway and any combination thereof. The URTORC's fully virtualized and scalable controller functionality supports ORAN's E2 interface specifications and works with multi-vendor RAN. As a result, it helps create a multi-vendor, open ecosystem of interoperable components for the various RAN elements and from different vendors. It can be software-upgraded to 5G RAN Controller functionality as non-standalone (NSA) and Standalone (SA) as the 5G standards are finalized. Being a 5G-native platform, it provides a smooth migration path from any combination of legacy RAN technologies (RATs) to 5G, utilizing any migration option for 5G (e.g., Option 7.1, Option 7.2, Option 8, etc.). The URTORC also enables the use of any of the new 5G management technologies, such as RRM, slicing, and orchestration, and the separation of real-time and non-real-time intelligence, for any combination of legacy RATs. An abstraction is used at the URTORC to enable these technologies for legacy RATs. The URTORC is paired with a Unified Non-Real-Time OpenRAN Controller (UNRTORC), in some embodiments, providing automation, orchestration, network sharing, network slicing, etc, in some embodiments. The URTORC and UNRTORC are architected as cloud-native SaaS technologies, in some embodiments, such as VNF or containerized virtual machines, enabling scaling, high availability, low latency, reduced energy usage, and the ability to run on commodity hardware, among other features.

Figure 2:
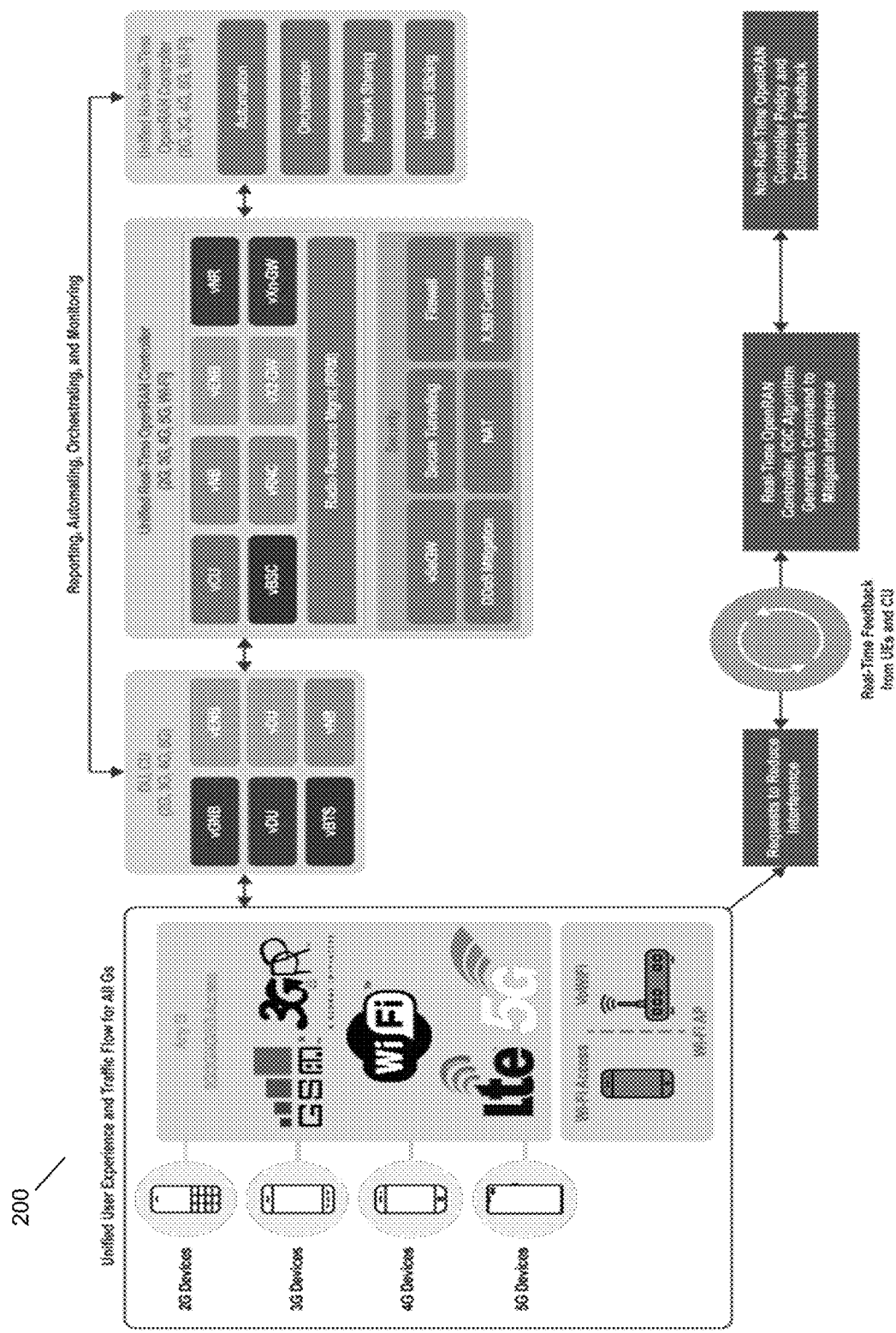
FIG. 2 is a diagram showing network intelligence enabled by an OpenRAN controller, in accordance with some embodiments.

FIG. 2 is a diagram showing network intelligence 200 enabled by an OpenRAN controller, in some embodiments. Real Time Controller provides OpenRAN defined Near Real-Time RAN Intelligent Controller (RIC) functionality and extends it to real time. It provides complete RAN orchestration, real time SON including self-configuration, self-optimization, and self-healing. All new radio units are self-configured by the software, reducing the need for manual intervention, which will be key for 5G deployments of Massive MIMO and small cells for densification. The self-optimization is responsible for necessary optimization related tasks across different RANs, utilizing available RAN data from all RAN types (macros, Massive MIMO, small cells) from the Analytics Service. The pro-active approach utilized by the Parallel Wireless platform, in contrast to the legacy re-active optimization approach, improves user experience and increases network resource utilization, key for consistent experience on data intensive 5G networks.

As shown in FIG. 2, the 5G functional split between RU/DU/CU is enabled using a DU/CU component in communication with the RAN; however, in some embodiments, this architecture is enhanced to provide the benefits of a RU/DU/CU split functionality to any combination of legacy RATs. So for example, the baseband for 2G and 3G may be provided at the DU of the architecture as shown, and, as the latency and bandwidth needs of 2G and 3G are less demanding relative to 5G, these legacy RAT functionalities may be partially or completely supported at the 5G-capable DU without requiring additional hardware. This is enabled by implementing 2G, 3G, 4G legacy RATs in software and running these functionalities at the 5G-capable DU, or running them at the RU or the CU or wherever most appropriate, all made possible by the use of modern, high-speed processors and software.

A variety of functional splits are also possible, especially with the expanded latency and processing budgets of legacy RATs. The functional splits may be enabled for the legacy RATs by using custom protocols to send 2G, 3G, and 4G-specific radio resource control instructions from a CU to a RU, etc. As these functions are already present for the use of 5G functional splits at the RU/CU/DU, the processing and RRM scheduling can be used for the legacy RATs as long as the RAN nodes are configured to coordinate with the controlling DU/CU.

As well, as described in relation to FIG. 1, URTORC and UNRTORC enable the use of various technologies originally developed for 5G together with legacy RATs. As shown, this also enables real-time feedback from UEs and CU to reduce and mitigate interference, within any combination of RATs and across RATs, in some embodiments. As well, in some embodiments, network intelligence can be enabled across RATs as well, as described below.

Non-Real time controller function provides OpenRAN defined non Real-Time RAN Intelligent Controller (RIC) functionality such as configuration management, device management, fault management, performance management, lifecycle management for all network elements in the network. Network slicing, Security and Role Based Access Control and RAN Sharing are key aspects that are applicable to all the controller functions across the network. This software suite also provides a layer of intelligence that can be realized across the network by using telemetry information gathered from across the network. By providing timely insights into the network operations, operators can use Non-Real Time Controller to further understand and optimize the network. Fully complements the suite of products that Parallel Wireless offers today to realize, deploy, manage, and optimize the entire network with a single pane of glass.

Benefits

By disaggregating hardware and virtualized software, the Parallel Wireless OpenRAN software suite creates a unified architecture through abstraction of traditional RAN and core network functions on a COTS server for all outdoor or indoor deployment scenarios. It brings 5G software benefits (i.e. low latency and network slicing) across the network for ALL G (2G/3G/4G/5G), resulting in:

Unified OpenRAN Controller for 2G/3G/4G/5G, Unlicensed, Wi-Fi: a unified software-enabled architecture for past, present, and future Gs.

Deployment flexibility for 5G, 4G, 4G, 2G through consolidation of network functions and RAN/core interfaces.

End to End Network Slicing for all technologies: enables Mobile Operators to offers differentiated services to their different customers and markets, with specific SLA, QoS in an economically viable way through across RAN and core through fully 3GPP-compliant interfaces and functionality, enabling interoperability across multiple vendors and allowing for modernization of networks or selection of best of breed for 5G Cloud-Native deployments: Parallel Wireless fully virtualized, datacenter agnostic and cloud-native architecture allows Mobile Operators to take advantage of the most modern Web-Scale technologies, including hyperscaling, to support the demands and new Use Cases of upcoming 5G and Wi-Fi6 networks.

Real-time responsiveness to subscriber needs through edge-centric architecture to deliver best performance for voice and data, outdoors or indoors, across 2G/3G/4G/5G.

Ease of deployment, faster time to market through network automation: with plug-n-play configuration and intelligent network optimization, mobile operators are enabled to follow the "fail fast" model to try multiple Use Cases with much shorter implementation times.

Reduction in CapEx and OpEx: professional services spent on deployment or maintenance can be reduced by up to 80%. Overall project TCO can see reductions of 60%, when considering lower CapEx and OpEx.

Deployment Options

Figure 3:
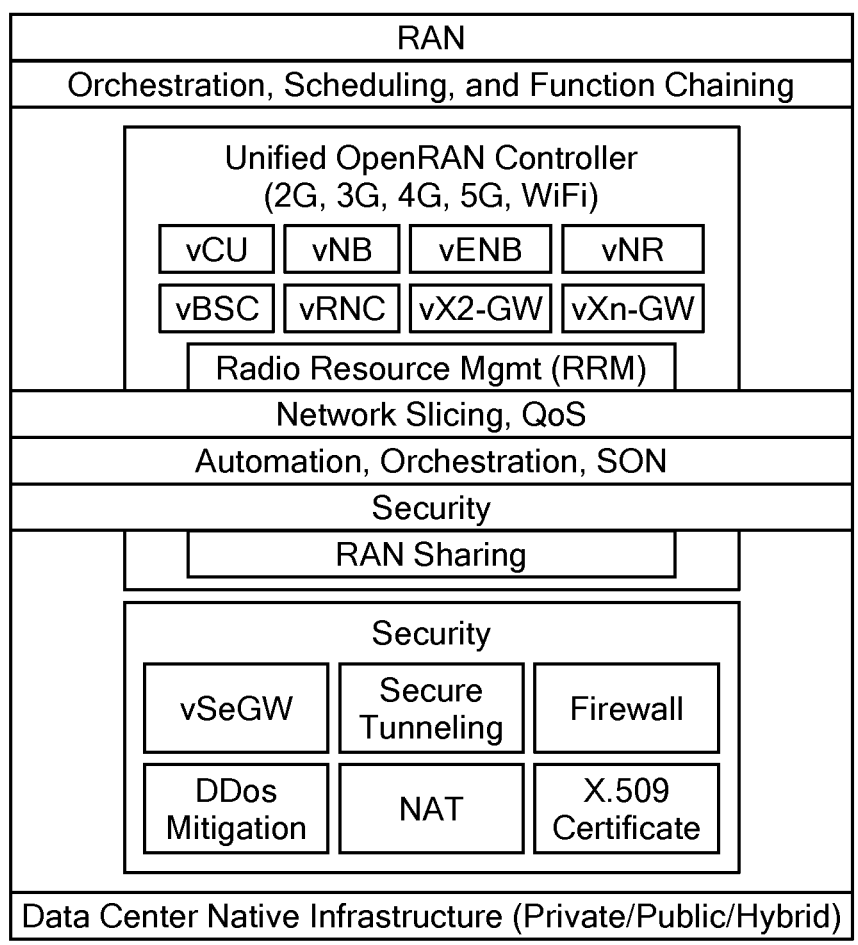
FIG. 3 is a diagram showing a multi-technology OpenRAN controller, in accordance with some embodiments.

FIG. 3 is a diagram showing a multi-technology OpenRAN controller 300. The Parallel Wireless OpenRAN Controller (both Real Time and Non-Real Time) can be deployed as a VNF or Composite VNF (a federation of VMs or Containers behaving like a single logical entity), in some embodiments. The controller supports 2G (vBSC), 3G (vNB, vRNC), 4G (vENB, vX2GW), and 5G (vXnGW) via virtualization. The overall solution is compliant with ETSI's NFVI architecture, agnostic to the underlying data center infrastructure so can use any Intel x86 server. The solution has been certified and deployed with all major market leading hypervisors. It can be managed via any standards-compliant VNF Manager (VNFM) and NFV Orchestrator (NFVO). Parallel Wireless has a strong Partnerships ecosystem in place with all leading vendors in virtualization space.

Certain functions are shown as crossing multiple OpenRAN controller boundaries. So for example, orchestration, scheduling, and function chaining; network slicing and QoS; automation, orchestration, and SON; and security features may all operate across one or multiple OpenRAN controllers, and across one or multiple RATs. This enables the OpenRAN controller to perform orchestration across a larger segment of an operator's network, for example, coordinating multiple physical towers, each with 3 sectors of RAN for a plurality of RATs. This can be useful, for example, when a high capacity event such as a natural disaster occurs and there is a need to reduce service levels across multiple RATs and multiple sectors, to prioritize first responders and to provide a lower level of service with greater reliability. Network intelligence is also collected and analyzed across RATs and controllers, as described further below at FIG. 5.

Examples of deployment scenarios suitable for the use of the present architecture also include:

Coverage: providing new RAN coverage to areas without mobile service

Capacity/Densification: adding capacity to existing 2G/3G/4G networks

Network modernization: replacing outdated legacy technologies (i.e.: 2G, 3G) with newly virtualized functions, along with newer technologies like 4G and 5G, all with the same architecture Network expansion: A use Case scenario where a mobile operator deploys Parallel Wireless OpenRAN solution to extend and expand coverage as an addition to an existing network.

Abstraction of Access and Core

OpenRAN Software Suite virtualizes the RAN interfaces to manage the 5G, 4G, 3G, 2G cells in real-time via multi-technology SON while abstracting RAN changes from the core network and the core network itself from the RAN. The OpenRAN Software Suite virtualizes thousands of base stations to look like a few virtualized "boomer cells" to the core. The OpenRAN Software Suite virtualizes the radio network resources such as Wi-Fi APs, eNodeBs, NodeBs, and NRs and makes them self-configurable, self-optimizing, and self-healing which helps with the initial installation and on-going maintenance and reduces the overall TCO. Abstraction also enables any-G interoperability, where the RAN can be a mixture of one or more RATs, including legacy RATs ("any access"), and can be connected via various types of backhaul and/or CU/DU splits ("any haul"), and the core can be a 5G core or a legacy core ("any core"), and the OpenRAN Software Suite seamlessly enables RAN features to "just work" when the underlying core network is available, or in some cases interworks features to enable them to work with a core having another RAT (such as enabling inter-RAT session continuity by anchoring at the OpenRAN Controller), thereby enabling multiple use cases ("any service").

Features and Capabilities

Figure 4:
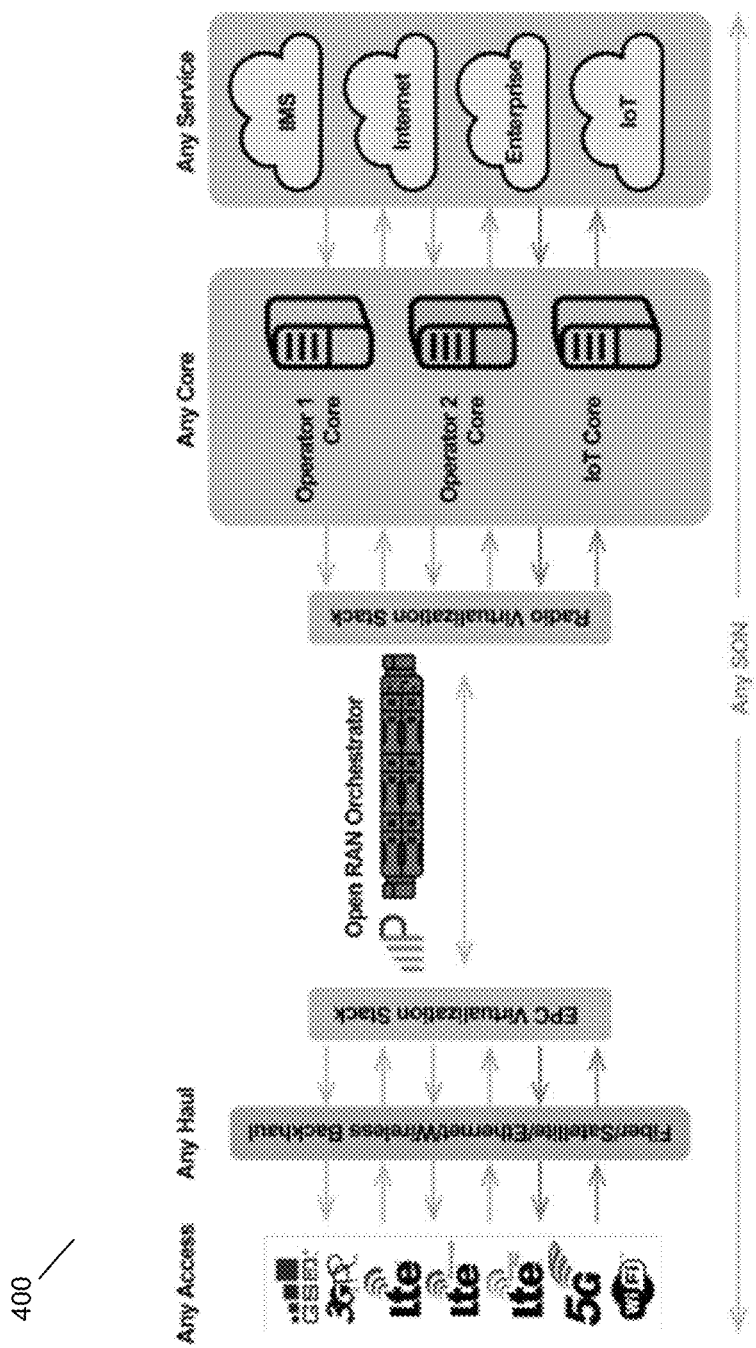
FIG. 4 is a diagram showing a system including an OpenRAN controller, in accordance with some embodiments.

FIG. 4 is a diagram showing a system 400 including an OpenRAN controller. Parallel Wireless OpenRAN Software Suite helps operators cost effectively roll out new cells or Wi-Fi APs and manage coverage and capacity of existing nodes by reducing complexity between RAN and the core sides of the network with abstracting RAN and core sides of the network with "many-to-one-to-many" app roach:

Any Access Any Haul

On the RAN side of the network, the software virtualizes existing cells into resources that can be allocated dynamically. It virtualizes thousands of base stations to look like a few virtualized "supercells" to the core. This capability allows operators to expand their RAN for additional coverage and capacity without putting any additional strain from signaling on the core components. This capability allows the software to aggregate S1 and X2 interfaces from the nodes under its management. This aggregation allows anchoring of all the traffic for seamless handoffs between 5G, 4G, 3G, 2G, and Wi-Fi technologies. The software suite can use 3GPP standard interfaces to communicate to nearby 2G, 3G, 4G, or 5G macros or Wi-Fi APs: standard X2 interfaces to communicate with nearby 4G macros; as a virtual RNC, uses Iu-CS and Iu-PS interfaces to communicate with MSC and 3G packet core; and SWu interface to talk to Wi-Fi UEs. The software uses this collective information to mitigate interference. OpenRAN Software suite is able to make real-time decisions based on its direct position in the signaling and data path and interworking of various multi-technology virtualized gateway functions. It also handles mobility and session continuity across UMTS, Wi-Fi, LTE or 5G with local anchoring on the OpenRAN controller.

On the core side, the software virtualizes multiple cores into a pool of resources for the multi-technology RANs and presents them as standard interfaces to packet core. By aggregating multi-RAT traffic, the software enables signaling reduction towards the core and mitigates any signaling storms. By virtualizing core towards the RAN, OpenRAN controller allows operators to deploy multiple packet cores, support MOCN, optimize IoT traffic, enable eMBMS, and provide more profitable MVNOs offerings.

This capability is designed to handle deployment challenges from building a new network, to scaling the network, to filling coverage gaps that traditional network architecture is not designed to handle—all at a lower cost.

In addition to being able to handle 5G, 4G, 3G, 2G RAN and Core functionality, the Software Suite would be able to support multiple 5G network architecture deployment options simultaneously. Each gNodeB can be configured to work as an en-gNB for NSA Option 3/3a/3x or as gNB for SA Option 2. Intelligent algorithms in the software platform can handle routing of signaling and data from each eNB/gNB to the required EPC/5GC. The intelligent algorithms are also able to provide slicing like functionality to legacy 2G/3G networks as well as 4G.

Slicing helps to support new use cases and differentiated experiences including private networks and will be a source of new revenue for the mobile operators.

Our Analytics Products provide unified converged network intelligence for 2G/3G/4G/5G/WiFi for indoor and outdoor mobile networks. The suite consists of a comprehensive set of tools to deploy, manage, and optimize network operations. Aimed at making Network Operation smooth and seamless, the Parallel Wireless solution provides immediate and actionable intelligence for preventive and corrective actions that help customers with reducing unplanned downtime and planning for network expansion.

Our Network Intelligence software suite works with and complements all components including RAN, Unified OpenRAN Controller, Unified Edge Core, Security Gateway and is aware of network slices and RAN sharing across the network.

Operational Challenges

Figure 5:
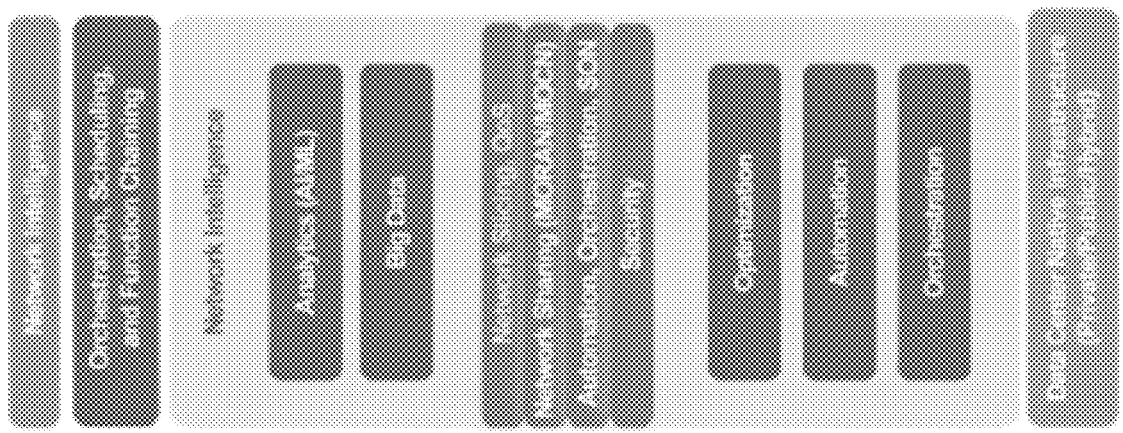
FIG. 5 is a diagram showing the processing of real-time and non-real-time data, in accordance with some embodiments.

FIG. 5 is a diagram showing the processing of real-time and non-real-time data 500.

Managing mobile networks that are stable, secure, and scalable introduces additional levels of complexity resulting from layers of virtualized infrastructure and VNFs (virtualized network functions) that run on it. Network functions, when disaggregated and deployed, manifest a level of complexity that makes it much harder to manage, optimize and support. At scale, this level of complexity is much more amplified and generates massive amounts of data from a variety of sources including end-users, traffic and weather conditions, and the network itself.

To ensure optimal operation of the network, this information must be processed and analyzed in real-time, especially for providing all generations of wireless network technologies, including 5G.

Parallel Wireless products provide a platform for ingesting and processing real-time data and non-real time along with unstructured data such as logs, events etc. Network deployments can span millions of subscribers generating billions of events over a period of time that varies across time and space. Data variability across time and space poses a challenge to network service providers as the amount of data could span weeks, months, or years. Data from millions of subscribers generates timeseries data that need to be corelated across geo-spatial data to help manage and optimize network operation for optimal performance. Network intelligence functions can include at least: Analytics (AVML); Function Chaining; Big Data; Security; Optimization; Network Slicing, QoS Network Sharing (MORAN/MOCN) Automation, Orchestration. The term SON is also used herein to mean any function, e.g., orchestration, taking into account a combination of the above network intelligence. The deployment of this network intelligence may be on a Data Center Native Infrastructure (Private/Public/Hybrid).

A large portion of the mobile network is subject to outdoor factors such as interference, environment, weather, and other natural causes that may adversely affect network performance. As a result of external trigger factors affecting network planning and operations, operators rely on big data analytics. The analytics suite of products from Parallel Wireless help customers by improving service levels that lead to better customer retention while reducing total cost of ownership by providing accurate network analysis fueled by data-driven insights.

Descriptive, Diagnostic, Predictive and Prescriptive Analytics

Parallel Wireless offers a comprehensive set of tools across phases, starting with the descriptive phase of analytics. The first set of tools is meant to provide visibility into current operations of the network. Visibility is the first step to managing the network. Our tools provide key insights and metrics that provide actionable and timely insights. Beyond the visibility, our tools provide rationalizing the network operations and help customers to understand why network metrics exhibit current dynamics. Rationalizing is key to customers knowing how to manage the network thus providing heat maps, reduced downtime, and root cause analysis.

Parallel Wireless provides customers beyond network visibility and helps predict network behavior and remedial actions to prevent unplanned downtime, prepare for network expansion and improve customer satisfaction by reducing dropped calls, increased network coverage and improved handover efficiency.

With 5G use cases, analytics provide operators data-driven management and optimization of 2G/3G/4G/WiFi workload orchestrations to support network slice management, bandwidth optimization to evolve into providing eMBB, URLLC and MMTC across the network with varying levels of SLAs and high availability.

Network Automation

Focused on lowering TCO for service provides, our tools provide automation to help ease the deployment, lifecycle management and maintenance of the network. This layer of automation provides a way to capture the customer-specific, customized policies and procedures that ensure minimal user intervention.

The Parallel Wireless Analytics Module will also provide northbound interfaces for customers to be able to orchestrate and provide input for other intelligent network-wide load balancing, distributing workloads within the mobile networks appropriated based on requirements for each of the network functions. Some network function, such as real-time interference management of the cells based on UE reports, may be deployed closer to the tower as a virtualized function compared to trend analytics for network expansion planning workloads, which are better deployed at the data center with enough storage and computation.

Our Analytics suite also provides necessary data for training and inferencing of machine learning models essential for anomaly detection and prediction algorithms. In the area of intelligent network troubleshooting and analytics, classification algorithms will enable operators with assistance by complementing decisions.

Operators can leverage the rich set of tools that the Analytics suite of products provides to meet unexpected demand and be able to orchestrate and provision to achieve closed loop optimization that is impossible to realize without the help of Analytics.

Customer Benefits

A rich set of tools provides a level of network automation that helps drive TCO down for operators, eliminating manual errors with faster turnaround times. The network-wide visibility and intelligence provides improved subscriber experience driven by SON and AI enabled by analytics. Quicker resolution of outages and network maintenance leads to better customer retention thereby ensuring customers continued revenue. Analytics also help with identifying new areas that are new sources of revenue for service providers. And all the tools are built for cloud scale with cloud resiliency that is ready to meet the demands of the future and be able to orchestrate and provision to achieve closed loop optimization that is impossible to realize without the help of Analytics.

Deployment Options

This solution can be used in the network deployment within private or public or hybrid cloud-native environments and is built to achieve cloud scale. The Parallel Wireless solution thus supports scenarios and use cases applicable as the industry migrates to 5G. For example, this virtualized analytics solution could be used for smart radio management. In this example, information about road and traffic conditions and device health is gathered and reported to the data center. This in turn increases efficiency since the data center can monitor the status of the cells and dynamically add additional capacity before network congestion occurs. By monitoring traffic conditions, traffic can automatically be rerouted to the most efficient route.

Big Data Analytics

As a result of this solution, global mobile operators will be able to manage their Big Data Analytics under the same Network Function Virtualization (NFV) orchestration umbrella and bring real-time visibility into their networks to improve operational efficiency and reduce cost while improving end-user experience and creating new revenue opportunities.

Parallel Wireless Big Data is part of the software that enables Network Intelligence to all OpenRAN network elements across RAN, OpenRAN Controller, Edge Core and Security Gateway product suites. Providing a central data lake to store and process large amounts of complex unstructured and structured data serves as the foundational layer and creates many opportunities to mobile network operators for improving quality of service for end-users and businesses. Our network intelligence software module integrates Big Data Analytics with network optimization via real-time SON resulting in the improvement of end-user quality of experience. Big Data gets collected from all components across the network and other sources to form dynamic Data Lakes.

A rich set of tools provides a level of network automation that helps drive TCO down for operators, eliminating manual errors with faster turnaround times. The network-wide visibility and intelligence provides improved subscriber experience driven by SON and AI enabled by analytics. Quicker resolution of outages and network maintenance leads to better customer retention thereby ensuring customers continued revenue. Analytics also help with identifying new areas that are new sources of revenue for service providers. And all the tools are built for cloud scale with cloud resiliency that is ready to meet the demands of the future.

Network Optimization, Automation and Orchestration functions deliver customer value by lowering TCO, as well as providing deployment and management using Big Data store. Data stored and processed can also be accessed via open interfaces for building bespoke solutions as desired by service providers.

Edge Core

Parallel Wireless Edge Core, in the Network Software Suite, is a cloud-native, ETSI NFV-compliant Distributed Packet Core solution:

It consists of MME, SGW, PGW, AMF, SMF, UPF and N3IWF, providing the complete set of key Packet Core functions It can be deployed on public/private/hybrid cloud infrastructure, reducing the overall total cost of ownership (TCO) for the solution Its scalable architecture allows flexible deployments, from small-footprint cost-efficient LTE/5G core and from a few thousand to millions of subscribers.

It provides the lowest total cost of ownership (TCO)

It is a distributed solution that delivers superior subscriber experience

Figure 6:
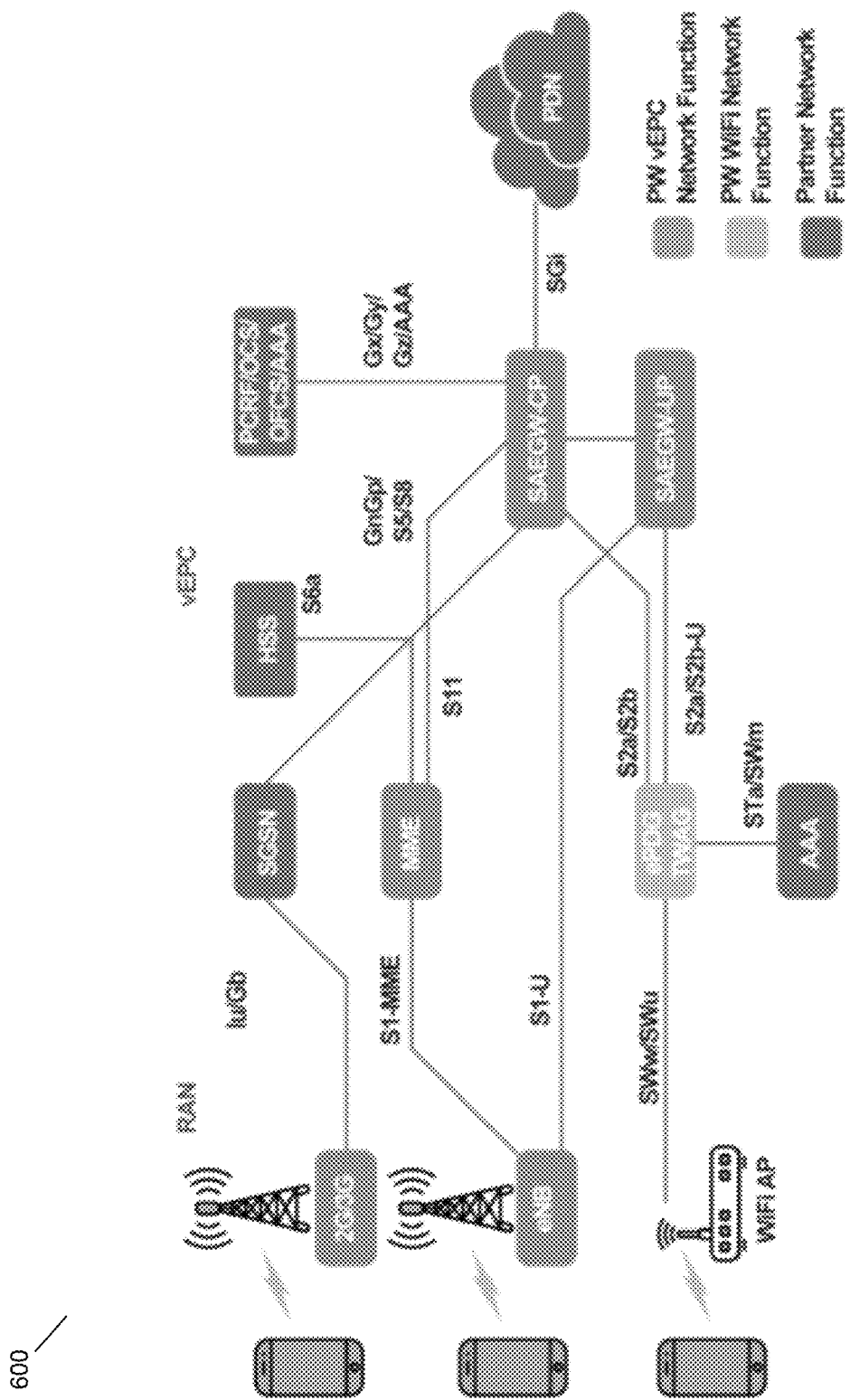
FIG. 6 is a diagram showing a distributed core, in accordance with some embodiments.

It enables new revenue opportunities for mobile operators, such as Private LTE, Public Safety LTE, LTE expansion, and Greenfield LTE Scaling from millions to billions of transactions, with voice and data handling that seamlessly scales up from gigabytes to petabytes in real-time, with consistent end-user experience for all types of traffic FIG. 6 is a diagram showing a distributed core 600.

Parallel Wireless Edge Core is a Full-fledged Converged Packet Core Solution for 2G/3G/4G/5G, MEC and Wi-Fi networks. It not only provides a standards-compliant solution but also builds on top many value-added features and capabilities.

The key features include:
3GPP-compliant
Cloud-native solution
High availability, carrier-grade scalable vEPC/5GC
Integrated with Parallel Wireless's software
Real-time 2G, 3G, 4G, 5G, Wi-Fi SON
2G, 3G, 4G, 5G and Wi-Fi gateways as VNFs on the software suite
MME, PGW, SGW, ePDG, TWAG
AMF, SMF, UPF, N31WF Support for Local Breakout (LBO).

Inline SPI/DPI

Gi-LAN service chaining

E2E solution for enterprise, Tier2 and Tier 3

Unlicensed/Wi-Fi/Fixed access

Edge deployments use cases; URLLC use cases; 5G use cases

IoT/Industrial IoT Benefits:

New revenue opportunities

Ease of deployment, agility, faster time-to-market (enables "Fail-Fast" model)

End-to-end network slicing for all technologies

Reduces CAPEX and OPEX, thus lowering overall TCO

Deployment Options

Parallel Wireless Edge Core can be deployed in a range, from small private LTE to big LTE networks.

Centralized: Fully converged and redundant EPC/5GC core in the central data center.

Local: EPC/5GC as a Compact and Portable Network in a Case or Backpack for Public Safety LTE. Enterprise and Private LTE core enabled.

Distributed: In the centralized data centers with CUPS CP (Control Plane) and UP (User Plane) in different data centers.

Deploy MEC with mix of User Planes at the Edge with rest of the Control Plane functions hosted in central data center(s).

To deliver new services: deploy VoLTE/VoWiFi/VoNR faster and at lower cost

Edge Deployment

Figure 7:
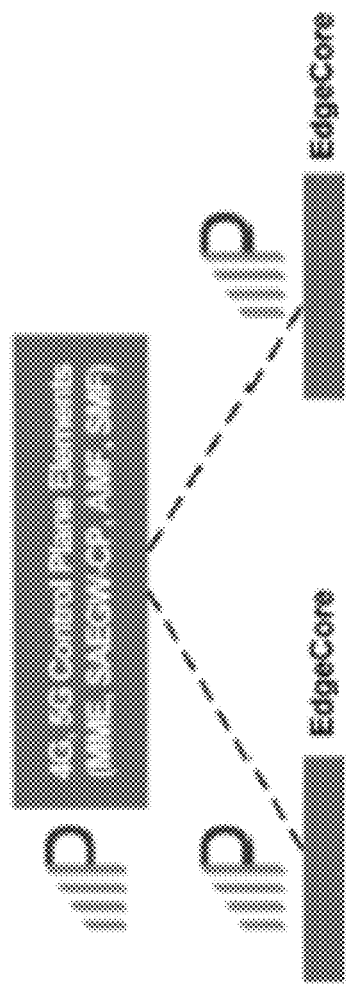
FIG. 7 is a diagram showing distributed core edge deployment, in accordance with some embodiments.
Figure 7:
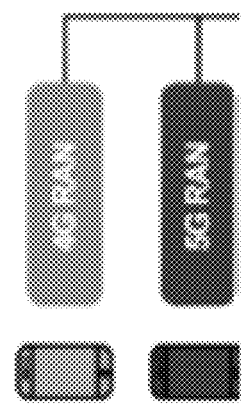

FIG. 7 is a diagram showing distributed core edge deployment 700.

Parallel Wireless Edge Core solution provides the ability to deploy Distributed Core with flexibility to distribute the different functions across the network as per the needs of the use cases. For Edge In the centralized data centers with CUPS CP (Control Plane) and UP (User Plane) in different data centers.

Deploy MEC with mix of User Planes at the Edge with rest of the Control Plane functions hosted in central data center(s).

To deliver new services: deploy VoLTE/VoWiFi/VoNR faster and at lower cost

Figure 8:
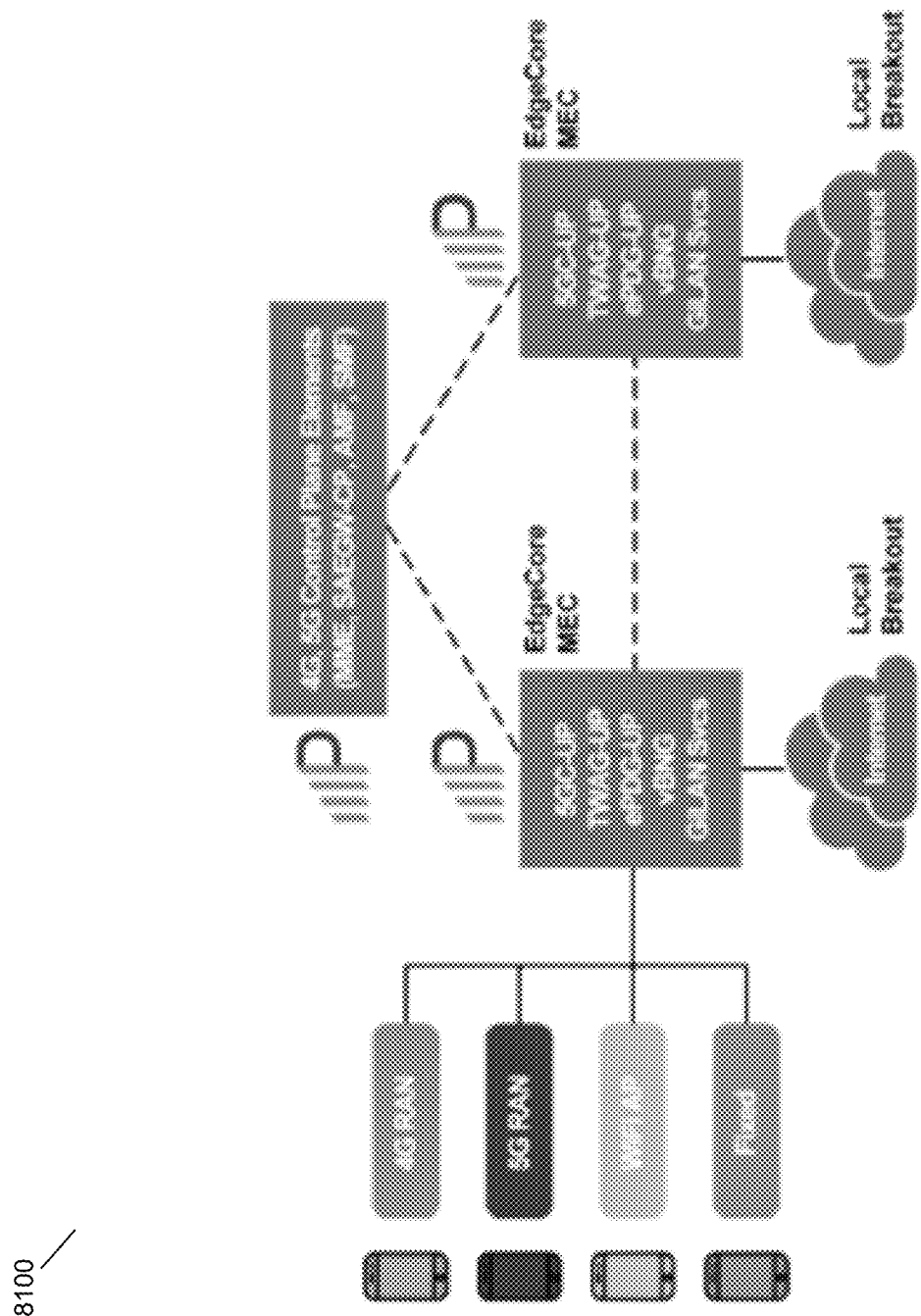
FIG. 8 is a diagram showing a converged edge solution, in accordance with some embodiments.

FIG. 8 is a diagram showing a converged edge solution 800.

Converged Edge solution for 4G/5G, WiFi, Fixed Access

Significant latency reduction for offloaded traffic (LBO), crucial for low-latency 5G traffic Value added services (GiLAN) offered (NAT, Tethering Det, TCP Opt, etc) locally at the Edge This leads to following benefit s:

Simplified Converged Distributed Core solution.

Enables Ultra Low Latency (ULL)-sensitive applications.

Allows the launch of value-added use cases and services to end users

Parallel Wireless software platform provides mobile operators with a cloud-based, fully redundant, high throughput platform for various gateway Virtualized Network Functions (VNFs.) It also performs Self-Organizing Network (SON) functionality for SG, LTE (4G), Universal Mobile Telecommunications System UMTS (3G), Wi-Fi, Global System for Mobile Communication (2G).

Features and Capabilities

Figure 9:
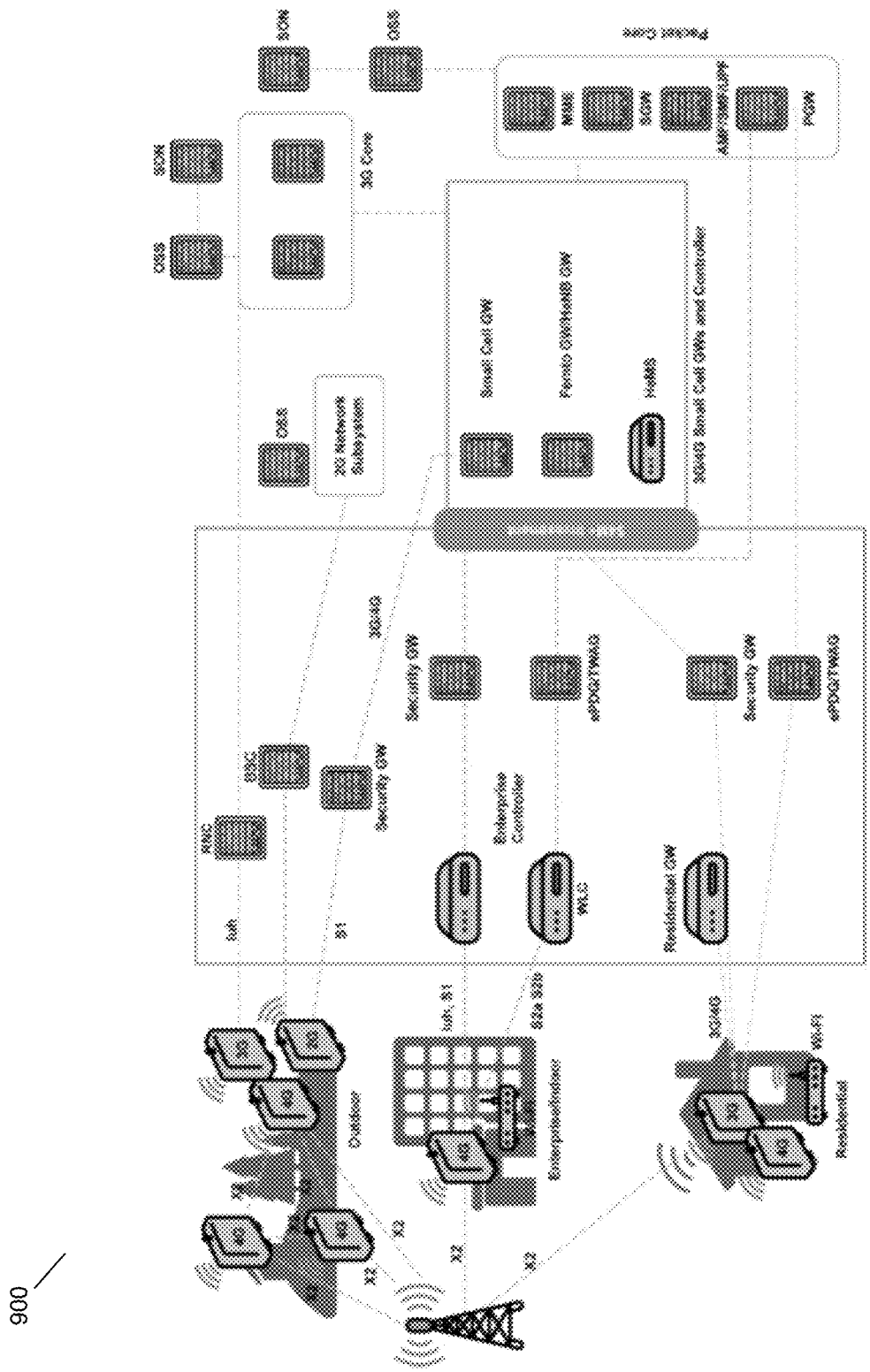
FIG. 9 is a diagram showing OpenRAN controller deployment, in accordance with some embodiments.

The function consolidation as VNFs includes:

FIG. 9 is a diagram showing OpenRAN controller deployment 900.

OpenRAN Controller: The OpenRAN Controller is responsible for radio connection management, mobility management, QoS management, edge services, and interference management for the quality of end user experience. Different RAN functionalities consolidate on this software platform, reducing complexity and making overall network maintenance simpler and less resource intensive.

Currently released OpenRAN controller module virtualizes vBSC/2G gateway, 3G gateway/vRNC, 4G gateway/X2 gateway, Wi-Fi gateway. The fully virtualized and scalable controller functionality supports standard E2 interface and works with multi-vendor RANs. As a result, it helps create a multi-vendor, open ecosystem of interoperable components for indoor and outdoor deployments.

Parallel Wireless's 2G/3G/4G/5G OpenRAN and Network software platform enables openness through the complete decoupling of hardware and software functionality. This functional separation enables the software to support all the different protocol splits between DUs and CUs based on available backhaul/fronthaul options.

It can be software-upgraded to 5G OpenRAN Controller functionality as non-standalone (NSA) and Standalone (SA) as the 5G standards are finalized. Being a 5G-native platform, it provides a smooth migration path to 5G utilizing any migration option.

Figure 10:
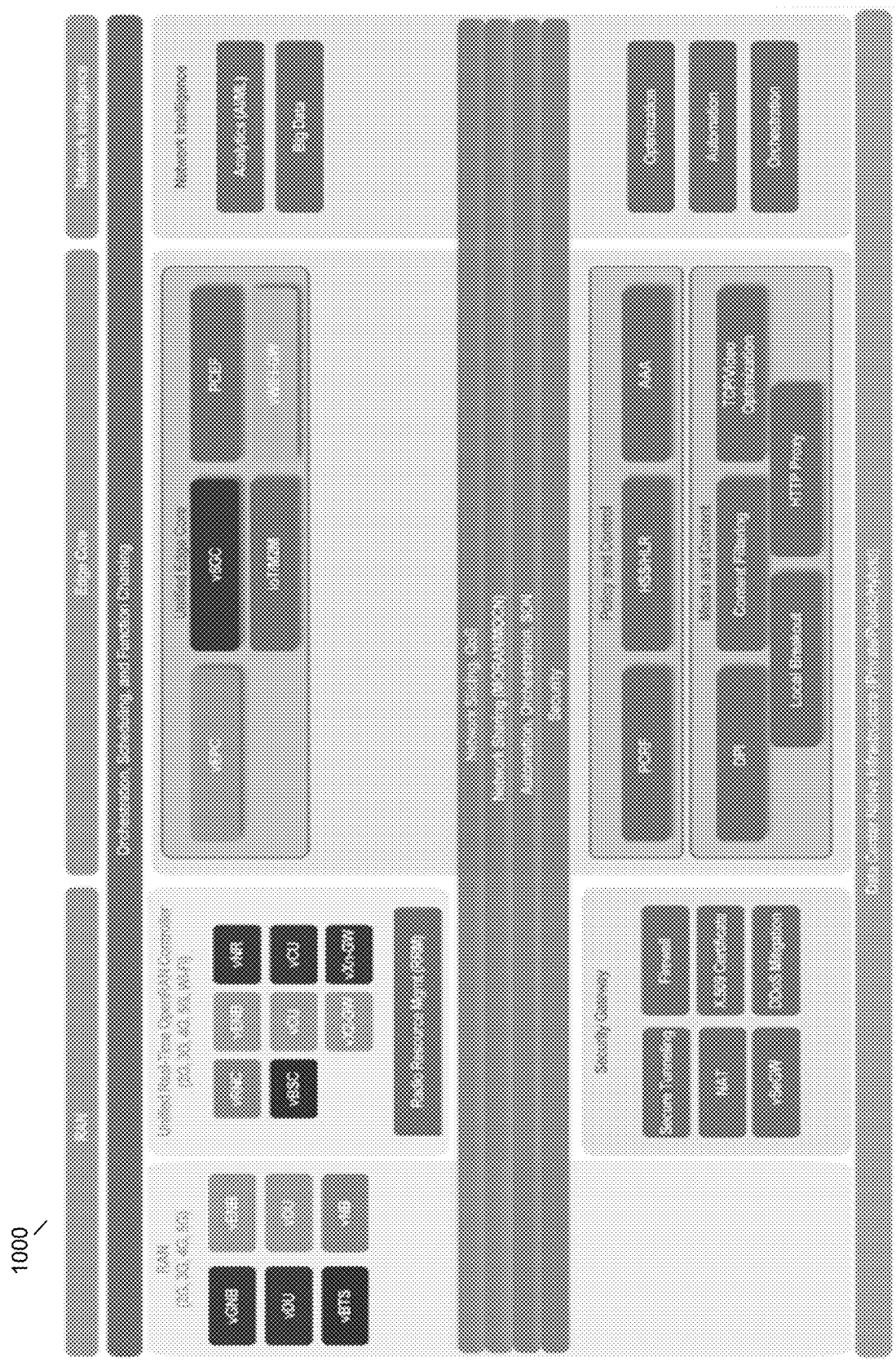
FIG. 10 is a diagram showing a network orchestrator, in accordance with some embodiments.

FIG. 10 is a diagram showing a network orchestrator 1000.

Network Orchestration and Real-time SON: The Software Platform also provides complete RAN orchestration including self-configuration, self-optimization, and self-healing. All new radio units are self-configured by the software, reducing the need for manual intervention. All new radio units are self-configured by the software, reducing the need for manual intervention, which will be key for 5G deployments of Massive MIMO and small cells for densification. The self-optimization is responsible for necessary optimization related tasks across different RANs, utilizing available RAN data from all RAN types (macros, Massive MIMO, small cells) from the Analytics module. The predictive approach utilized by the Parallel Wireless platform, in contrast to the legacy reactive optimization approach, improves user experience and increases network resource utilization, key for consistent experience on data intensive 5G networks.

Network Sharing enabler: Infrastructure sharing will be a key for 5G networks. Parallel Wireless OpenRAN software suite enables MOCN/MORAN by having the ability to view the traffic and route to the proper core. This then allows RAN sharing to happen without complication to any of the home networks. The OpenRAN controller simply requires connections to each core and handles the heavy lifting of routing the traffic properly.

Edge Core: a virtualized edge-centric core solution consisting of MME, SGW and PGW as well as AMF, SMF, UPF and N31WF, or any combination of these, deployed as Virtual Network Functions (NFV). Its scalable architecture allows flexible deployments, from small-footprint cost-efficient Packet Core from a few thousand to millions of subscribers.

Parallel Wireless Converged Network Intelligence serves as Non-Real Time RAN Controller in compliance with O-RAN alliance, powered by SON (Self Optimizing Network) and Analytics helps deploy and manage OpenRAN software, and is radio access-neutral supporting multiple radio access technologies across the network. This successful platform has been deployed around the world by many leading mobile operators. The software platform offers a flexible network architecture that integrates several network functions and enhanced services into a converged platform. This integration promotes seamless mobility through universal roaming, streamlines network management, enhances unified billing, and offers service uniformity as subscribers roam across different radio access technologies.

Features and Capabilities

The network intelligence module offers subscriber and network intelligence combined with powerful performance management to address the needs of large, high-demand, multimedia deployments for coverage and capacity. It delivers the high capacity, high availability and high performance required by today's 2G 3G and 4G networks and is readily upgradeable to 5G radio networks. Its system intelligence can perform a detailed inspection of each subscriber session, shaping and managing the session based on subscriber, application, or business policies. The platform utilizes deep packet inspection (DPI) technology, service steering, and intelligent traffic control to deliver this intelligence on a per-subscriber basis.

The Parallel Wireless Network Intelligence software module consists of real-time ALL G SON to enable ease of deployment and automated maintenance, Network Orchestration for real-time optimization, and Analytics to provide insights into the network health real-time and optimize the service hands free. This software is built for cloud scale and is secure and scalable to meet the demands of large new service rollouts.

Deployment Options

Our Network Intelligence software module is a VNF in our software suite and can be deployed in public, private, or hybrid cloud-hosted solutions. Networks of all sizes will benefit from ease of deployment and network programmability to deliver subscriber QoS.

Automation of complex and intensive tasks across RAN, OpenRAN Controller, Edge Core, and all other network elements within an OpenRAN architecture-based network deployment not only helps operators reduce cost, but it also enables them to be more agile in providing better coverage and improving QoS by deploying a mixture of many generations of mobile technologies (2G/3G/4G/5G/WiFi). SON and SON are essential and integral parts of next generation mobile architectures such as 5G.

The Parallel Wireless Network Service Orchestration provides complete RAN orchestration including self-configuration, self-optimization, and self-healing using Analytics and real-time SON functions. New radio units are self-configured by the software, reducing the need for manual intervention. The self-optimization provides necessary optimization across different RANs, utilizing available RAN data from the Analytics module. The predictive approach utilized by the Parallel Wireless platform, in contrast to the legacy reactive optimization approach, improves user experience and increases network resource utilization.

Features and Capabilities

Network Orchestrator performs intelligent orchestration, scheduling, and service chaining across the network and supports Network Slicing and Network Sharing natively. This level of orchestration enables operators to design and capture custom network differentiators while reducing TCO.

Parallel Wireless' approach to real-time orchestration and SON is to implement a truly hybrid SON where complex algorithms can run in a centralized Non-Real-Time Open-RAN Controller Software suite, which will have a universal view of the RAN conditions across many cells and RAT types (5G, 4G, 3G, 2G, and Wi-Fi). The orchestration engine facilitates schedulers and algorithms to be updated in base stations, thus readily bringing newer innovative features to base stations sooner. This SON solution operates in real-time with very proactive and fast reaction time. SON software has access to relevant data which can be used for predictive scheduling and user steering of traffic among different bands, cells, or sectors. The Non-Real Time Controller has a network-wide view that brings about continuous monitoring of KPls, triggering closed loop optimization, and with input from Big Data analytics, delivers ongoing performance optimization and network planning purposes.

This unique architecture supports multiple innovative algorithms, e.g. dynamic FFR, and Adaptive Transmit Power control with a holistic view of the network. Automation reduces human errors and external factors to provide a better QoS to users, especially users that are experiencing a poor QoS due to interference. Parallel Wireless' SON features for Self-Configuration, ANR and ICIC further automate network operation. Interference mitigation is solved across sectors, cells, indoor, outdoor, and even mobile base stations in vehicles.

The self-configuration features of the network orchestrator enable new cells to be added and configured using a plug-n-play app roach. Self-configuration capabilities also reduce the level of installer input and costs, ensuring that cells integrate correctly into the network. SON self-configuration feature identifies the new cells in the network, which allows SON to run the smart algorithm for hands-free configuration and reduces the time to "activate services" for the operator.

Parallel Wireless' approach to real-time orchestration and SON is to implement a truly hybrid SON where complex algorithms can run in a centralized Non-Real-Time Open-RAN Controller Software suite, which will have a universal view of the RAN conditions across many cells and RAT types (SG, 4G, 3G, 2G, and Wi-Fi). The orchestration engine facilitates schedulers and algorithms to be updated in base stations, thus readily bringing newer innovative features to base stations sooner. This SON solution operates in real-time with very proactive and fast reaction time. SON software has access to relevant data which can be used for predictive scheduling and user steering of traffic among different bands, cells, or sectors. The Non-Real Time Controller has a network-wide view that brings about continuous monitoring of KPls, triggering closed loop optimization, and with input from Big Data analytics, delivers ongoing performance optimization and network planning purposes.

This unique architecture supports multiple innovative algorithms, e.g. dynamic FFR, and Adaptive Transmit Power control with a holistic view of the network. Automation reduces human errors and external factors to provide a better QoS to users, especially users that are experiencing a poor QoS due to interference. Parallel Wireless' SON features for Self-Configuration, ANR and ICIC further automate network operation. Interference mitigation is solved across sectors, cells, indoor, outdoor, and even mobile base stations in vehicles.

The self-configuration features of the network orchestrator enable new cells to be added and configured using a plug-n-play approach. Self-configuration capabilities also reduce the level of installer input and costs, ensuring that cells integrate correctly into the network. SON self-configuration feature identifies the new cells in the network, which allows SON to run the smart algorithm for hands-free configuration and reduces the time to "activate services" for the operator.

Figure 11:
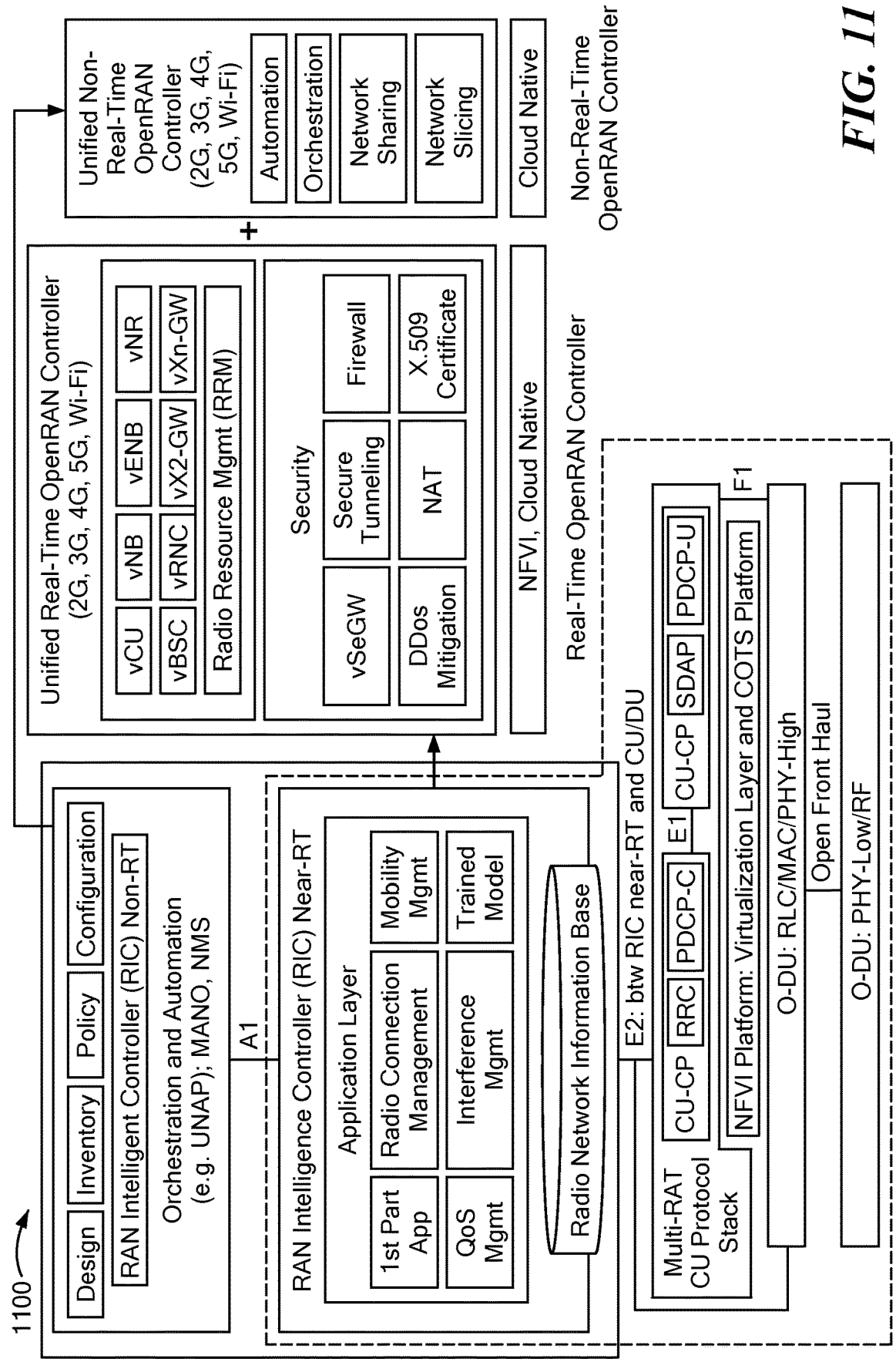
FIG. 11 is a diagram showing an OpenRAN network infrastructure, in accordance with some embodiments.

FIG. 11 is a diagram showing an OpenRAN network infrastructure 1100, in accordance with some embodiments.

The Parallel Wireless OpenRAN Controller enables Open RAN solutions. OpenRAN architecture disaggregates hardware and software components functionality that reduces TCO for Customers. Virtualized RAN functions deployed on the controller on the platform, reduces complexity and simplifies network maintenance, consumes optimal resources, and reduces total cost of ownership for our customers. Leveraging the ever-growing capacity of COTS x86-based servers and a fully-virtualized, hardware-agnostic architecture, customers can handle the bigger workloads and stricter requirements of 5G. Parallel Wireless offers the world's first OpenRAN Controller software suite to help mobile operators manage and grow their multi-vendor, All-G networks, while enjoying the benefits of lower TCO compared to legacy solutions.

OpenRAN Controller: This software suite is responsible for radio connection management, mobility management, QoS management, edge services, and interference management for the end-user experience. As currently released, the OpenRAN controller provides a virtualized 2G BSC, 3G RNC, 4G eNB, X2/S1 Gateway and any combination thereof. The fully-virtualized and scalable controller functionality supports ORAN's E2 interface specifications and works with multi-vendor RAN. As a result, it helps create a multi-vendor, open ecosystem of interoperable components for the various RAN elements and from different vendors. It can be software-upgraded to 5G RAN Controller functionality as non-standalone (NSA) and Standalone (SA) as the 5G standards are finalized. Being a 5G-native platform, it provides a smooth migration path to 5G utilizing any migration option.

Real Time Controller: It provides OpenRAN-defined, Near Real-Time RAN Intelligent Controller (RIC) functionality and extends it to real time. It provides complete RAN orchestration, real time SON including self-configuration, self-optimization, and self-healing. All new radio units are self-configured by the software, reducing the need for manual intervention, which will be key for 5G deployments of Massive MIMO and small cells for densification. The self-optimization is responsible for necessary optimization-related tasks across different RANs, utilizing available RAN data from all RAN types (macros, Massive MIMO, small cells) from the Analytics Service. The proactive approach utilized by the Parallel Wireless platform, in contrast to the legacy reactive optimization approach, improves user experience and increases network resource utilization, key for consistent experience on data-intensive 5G networks.

Figure 12:
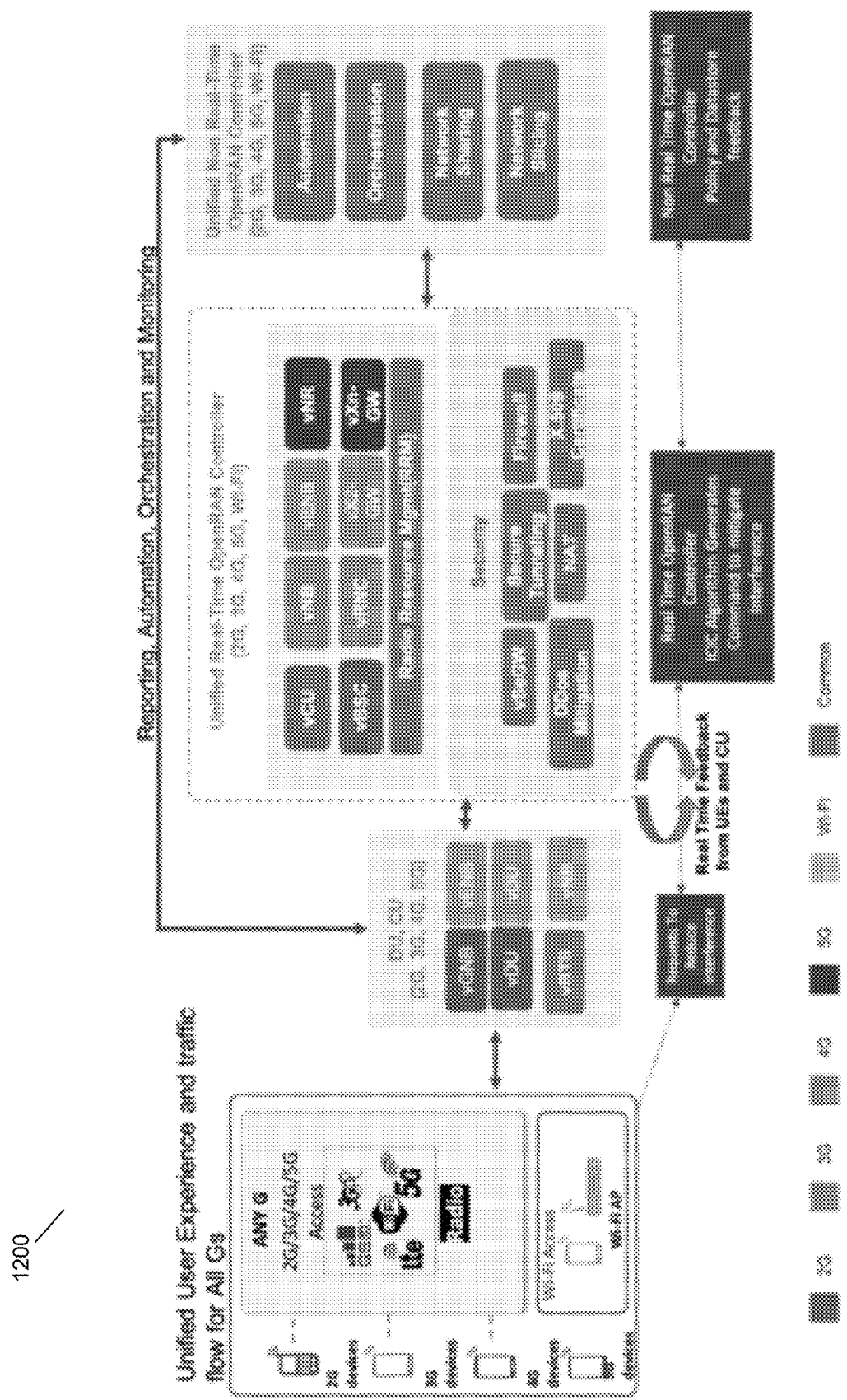
FIG. 12 is a diagram showing an OpenRAN network infrastructure, in accordance with some embodiments.

FIG. 12 is a diagram showing an OpenRAN network infrastructure 1200.

Non-Real Time Controller: Non-Real time controller function provides OpenRAN-defined, non-Real-Time RAN Intelligent Controller (RIC) functionality such as configuration management, device management, fault management, performance management, and lifecycle management for all network elements in the network. Network slicing, Security and Role-Based Access Control and RAN Sharing are key aspects that are applicable to all the controller functions across the network. This software suite also provides a layer of intelligence that can be realized across the network by using telemetry information gathered from across the network. By providing timely insights into the network operations, operators can use the Non-Real Time Controller to further understand and optimize the network. Fully complements the suite of products that Parallel Wireless offers today to realize, deploy, manage, and optimize the entire network with a single pane of glass.

Benefits

Figure 13:
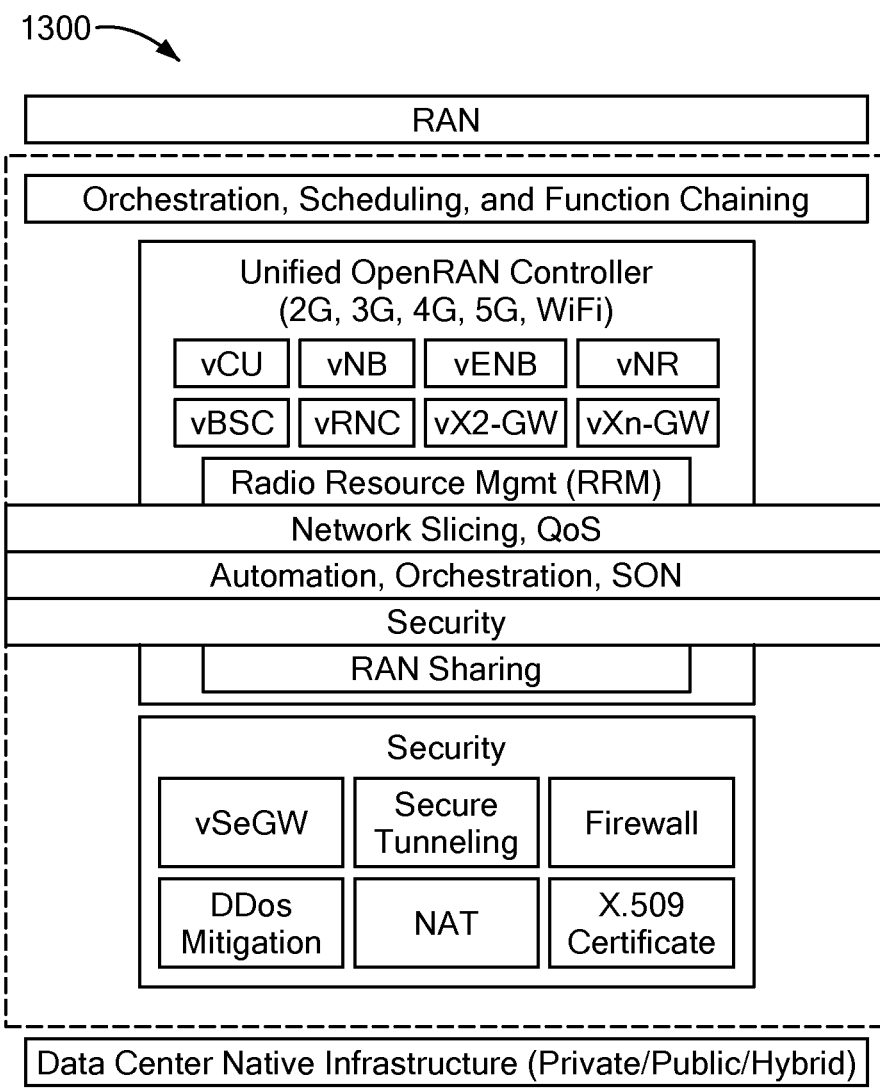
FIG. 13 is a diagram showing the OpenRAN software suite, in accordance with some embodiments.

FIG. 13 is a diagram showing the OpenRAN software suite 1300.

By disaggregating hardware and virtualized software, the Parallel Wireless OpenRAN software suite creates a unified architecture through abstraction of traditional RAN and core network functions on a COTS server for all outdoor or indoor deployment scenarios. It brings 5G software benefits (i.e. low latency and network slicing) across the network for ALL G (2G/3G/4G/5G), resulting in:

Unified OpenRAN Controller for 2G/3G/4G/5G,
Orchestration, Scheduling and Function Chaining
Unlicensed, Wi-Fi: a unified software-enabled architecture for past, present, and future Gs
Deployment flexibility for 5G, 4G, 4G, 2G through consolidation of network functions and RAN/core interfaces
End-to-End Network Slicing for All Technologies: enables mobile operators to offer differentiated services to their different customers and markets, with specific SLA,
Data Center Native Infrastructure (Private/Public/Hybrid)
Cloud-Native Deployments: Parallel Wireless's fully virtualized, datacenter-agnostic and cloud-native architecture allows mobile operators to take advantage of the most modern web-scale technologies, including hyperscaling, to support the demands and new use cases of upcoming 5G and Wi-Fi6 networks
Real-time Responsiveness to subscriber needs through edge-centric architecture to deliver best performance for voice and data, outdoors or indoors, across 2G/3G/4G/5G.
Ease of Deployment, Faster Time-to-Market through Network Automation: with plug-n-play configuration and intelligent network optimization, mobile operators are enabled to follow the "fail fast" model to try multiple
Real-time Responsiveness to subscriber needs through edge-centric architecture to deliver best performance for voice and data, outdoors or indoors, across 2G/3G/4G/5G.
Ease of Deployment, Faster Time-to-Market through Network Automation with plug-n-play configuration and intelligent network optimization, mobile operators are enabled to follow the "fail fast" model to try multiple use cases with much shorter implementation times.
Reduction in CapEx and OpEx: professional services spent on deployment or maintenance can be reduced by up to 80%. Overall project TCO can see reductions of 60%, when considering lower CapEx and OpEx Deployment Options The Parallel Wireless OpenRAN Controller (both Real Time and Non-Real Time) can be deployed as a VNF, Composite VNF, namely a federation of VMs or Containers behaving like a single logical entity). The overall solution is compliant with ETSI's NFVI architecture, agnostic to the underlying data center infrastructure so can use any Intel x86 server. The solution has been certified and deployed with all major market-leading hypervisors. It can be managed via any standards-compliant VNF Manager (VNFM) and NFV Orchestrator (NFVO). Parallel Wireless has a strong partnership ecosystem in place with all leading vendors in the virtualization space.

Examples of deployment scenarios:

Coverage: providing new RAN coverage to areas without mobile service

Capacity/Densification: adding capacity to existing 2G/3G/4G networks

Network modernization: replacing outdated legacy technologies (i.e.: 2G, 3G) with newly virtualized functions, along with newer technologies like 4G and 5G, all with the same architecture Network expansion: A use case scenario where a mobile operator deploys Parallel Wireless OpenRAN solution to extend and expand coverage as an addition to an existing network.

Parallel Wireless's datacenter-native software brings automation, optimization, agility, and fast deployment to the network. Our unified, software-based approach not only enables the new technologies such as 5G and 4G but also legacy 2G and 3G networks.

Parallel Wireless's network software suite allows operators to get the most out of their network assets and harness the cloud to modernize and future-proof their networks while making them interoperable, automated, and easy to deploy/maintain to support network growth and save cost.

Edge Core: a virtualized, distributed core solution consisting of MME, SGW and PGW, Wi-Fi gateway as well as AMF, SMF, UPF and N31WF, or any combination of these. Parallel Wireless Edgecore is a fully-distributed, cloud native solution. It enables deployment flexibility and allows operators to provide seamless user experience across multiple technologies.

Network Intelligence: Network Intelligence software is an overlay framework that provides intelligence across the entire software suite by enabling All G SON, network orchestration and analytics. It allows network optimization and improved QoE for end users.

Figure 14:
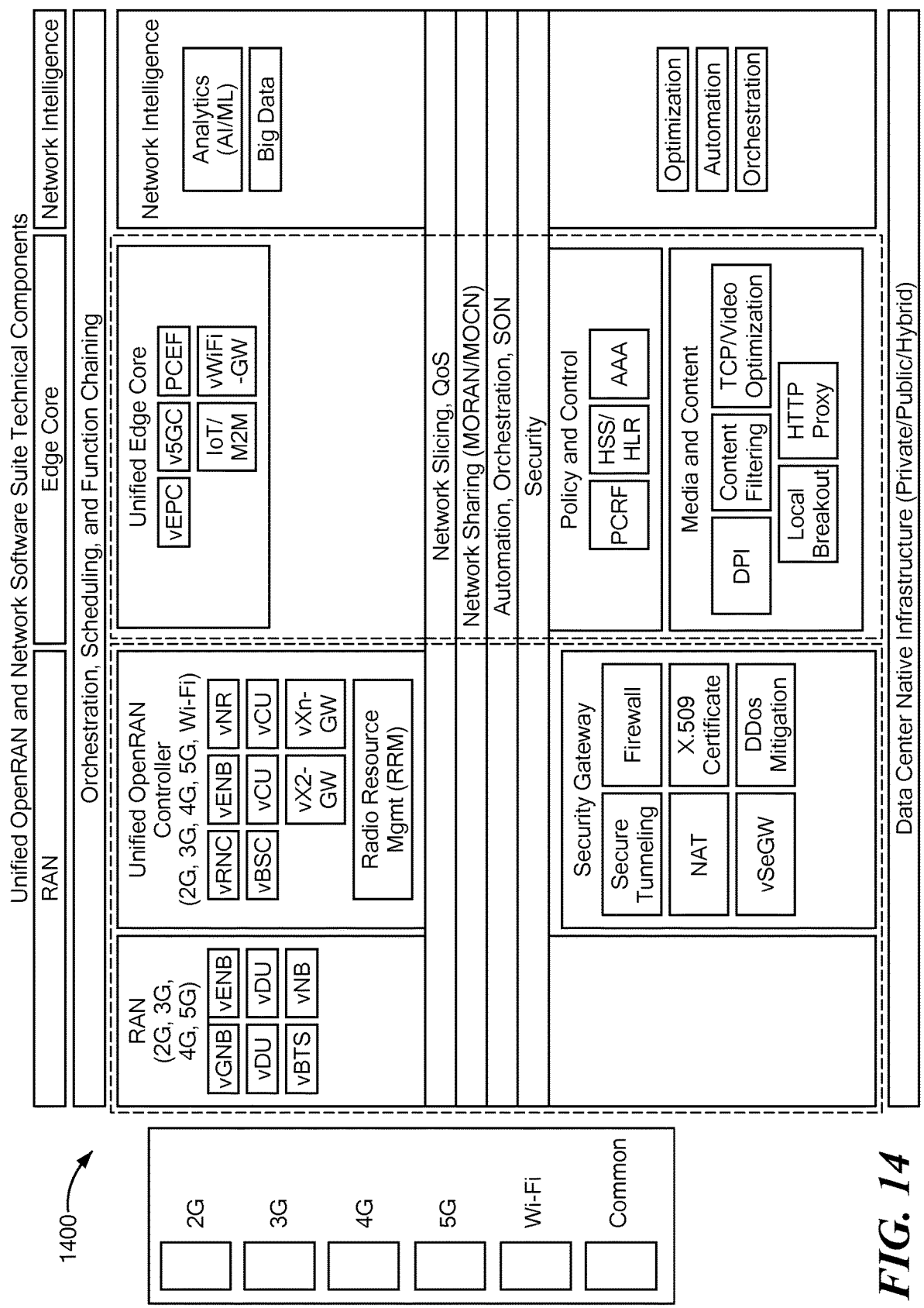
FIG. 14 is a diagram showing a solution for all Gs, in accordance with some embodiments.

FIG. 14 is a diagram showing a solution for all Gs 1400.

Figure 15:
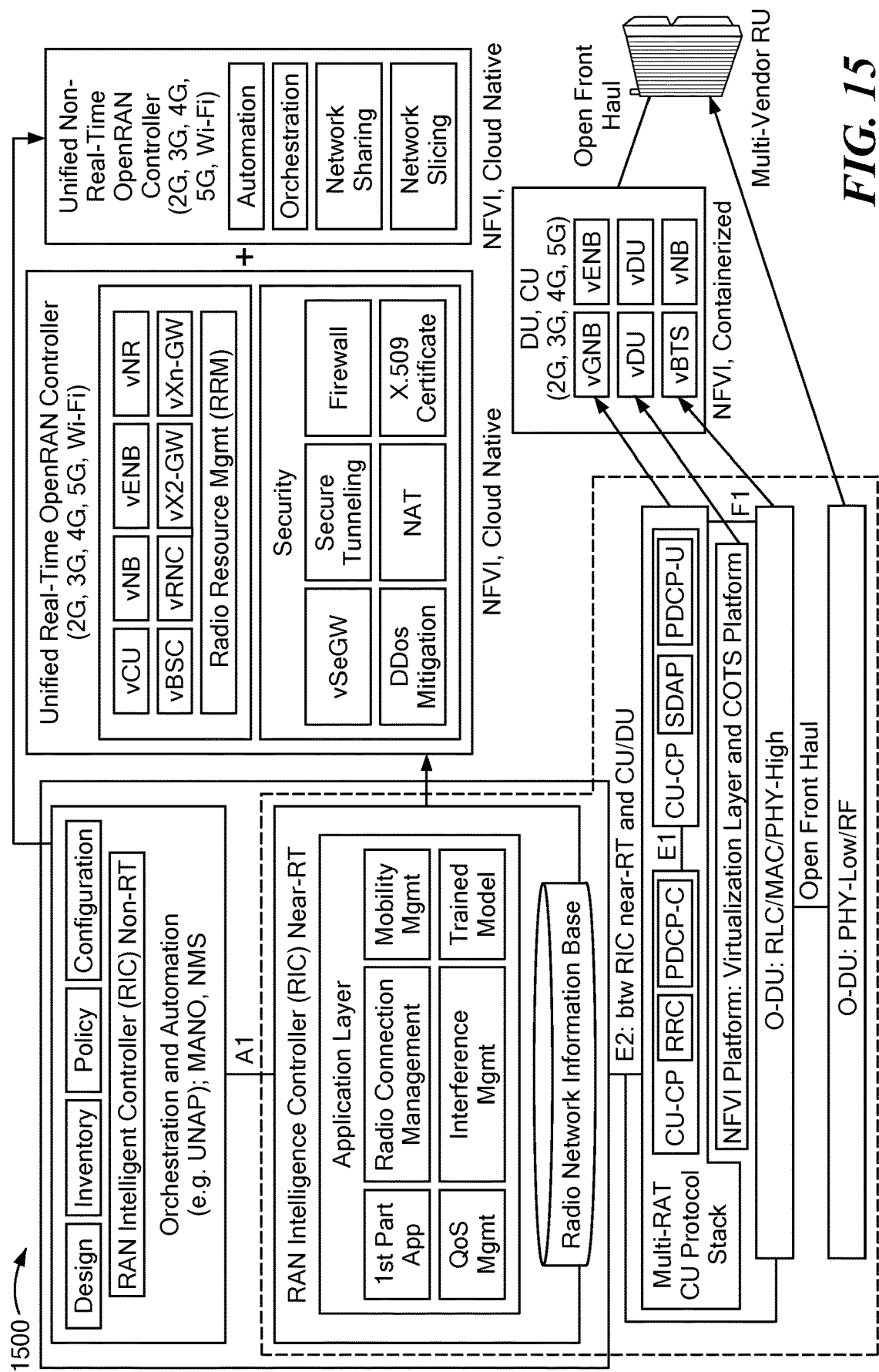
FIG. 15 is a diagram showing an OpenRAN network infrastructure, in accordance with some embodiments.

FIG. 15 is a diagram showing an OpenRAN network infrastructure 1500, in accordance with some embodiments.

RAN Sharing: Network Sharing Enabler: Infrastructure sharing will be key for 5G networks. The Parallel Wireless OpenRAN software suite enables MOCN/MORAN by having the ability to view the traffic and route to the proper core. This then allows RAN sharing to happen without complication to any of the home networks. The Parallel Wireless OpenRAN controller simply requires connections to each core and handles the heavy lifting of routing the traffic properly.

Figure 16:
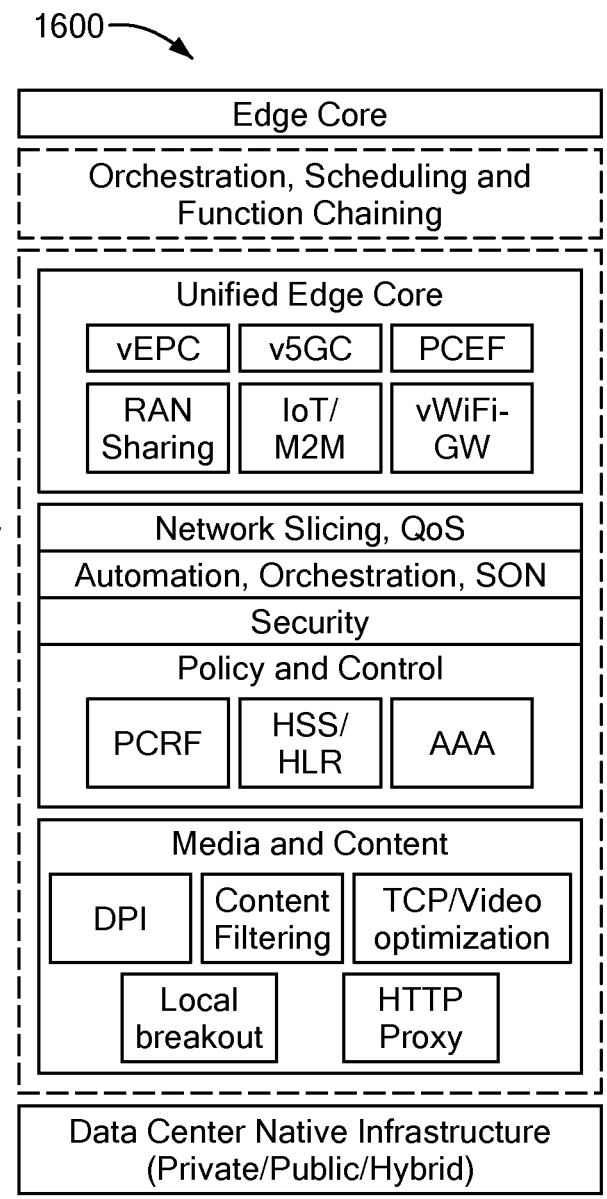
FIG. 16 is a diagram showing a data center native infrastructure, in accordance with some embodiments.

FIG. 16 is a diagram showing a data center native infrastructure 1600.

Use Cases Supported: Benefits:

5G, 4G, 3G, 2G large-scale deployments for outdoor and indoor

Network Sharing

Enterprise

Private Network

Public Safety

New revenue opportunities by enabling advanced services via analytics

OPEX reduction by network automation

Streamlined network management

Figure 17:
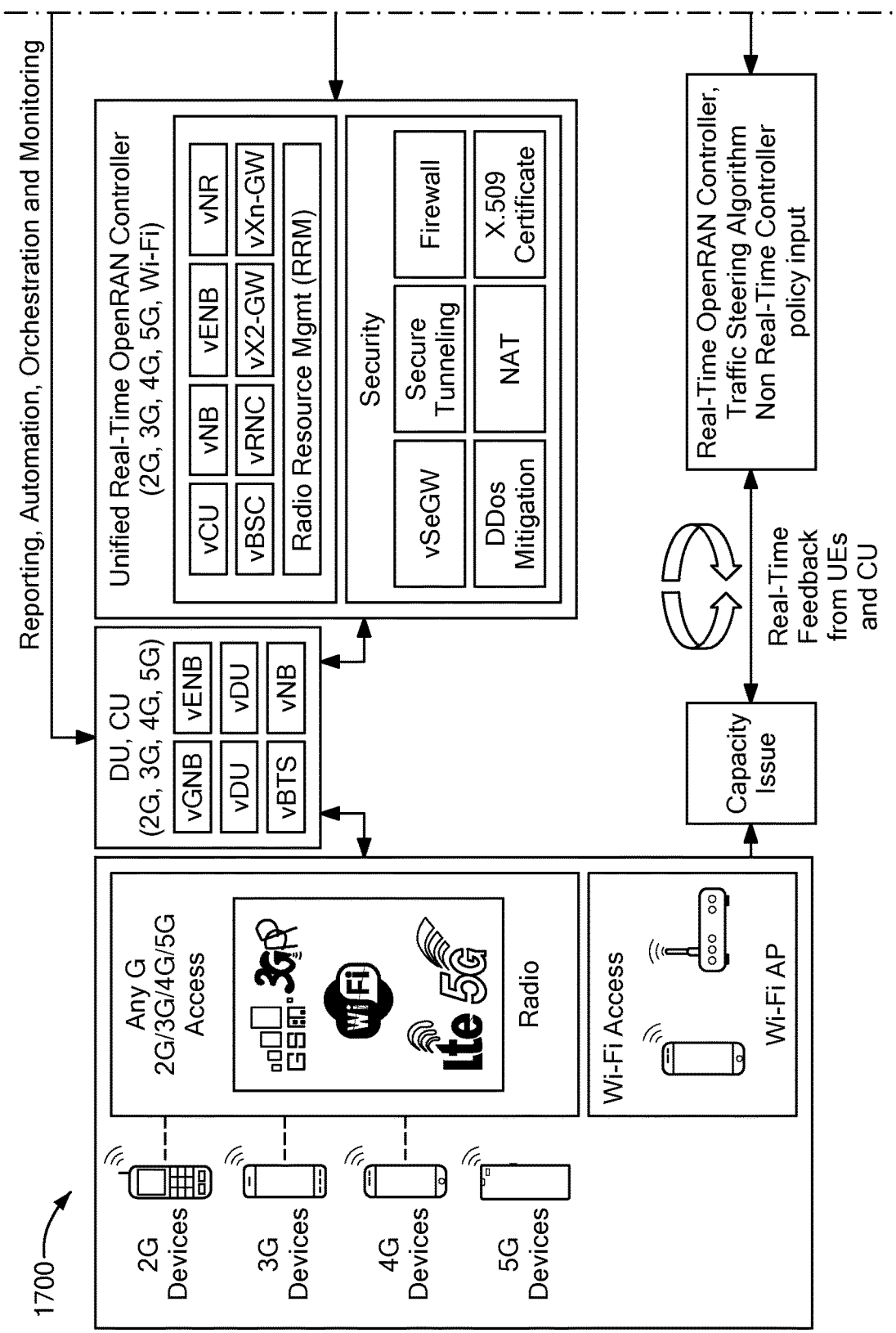
FIG. 17 is a diagram showing an OpenRAN network infrastructure, in accordance with some embodiments.
Figure 17:
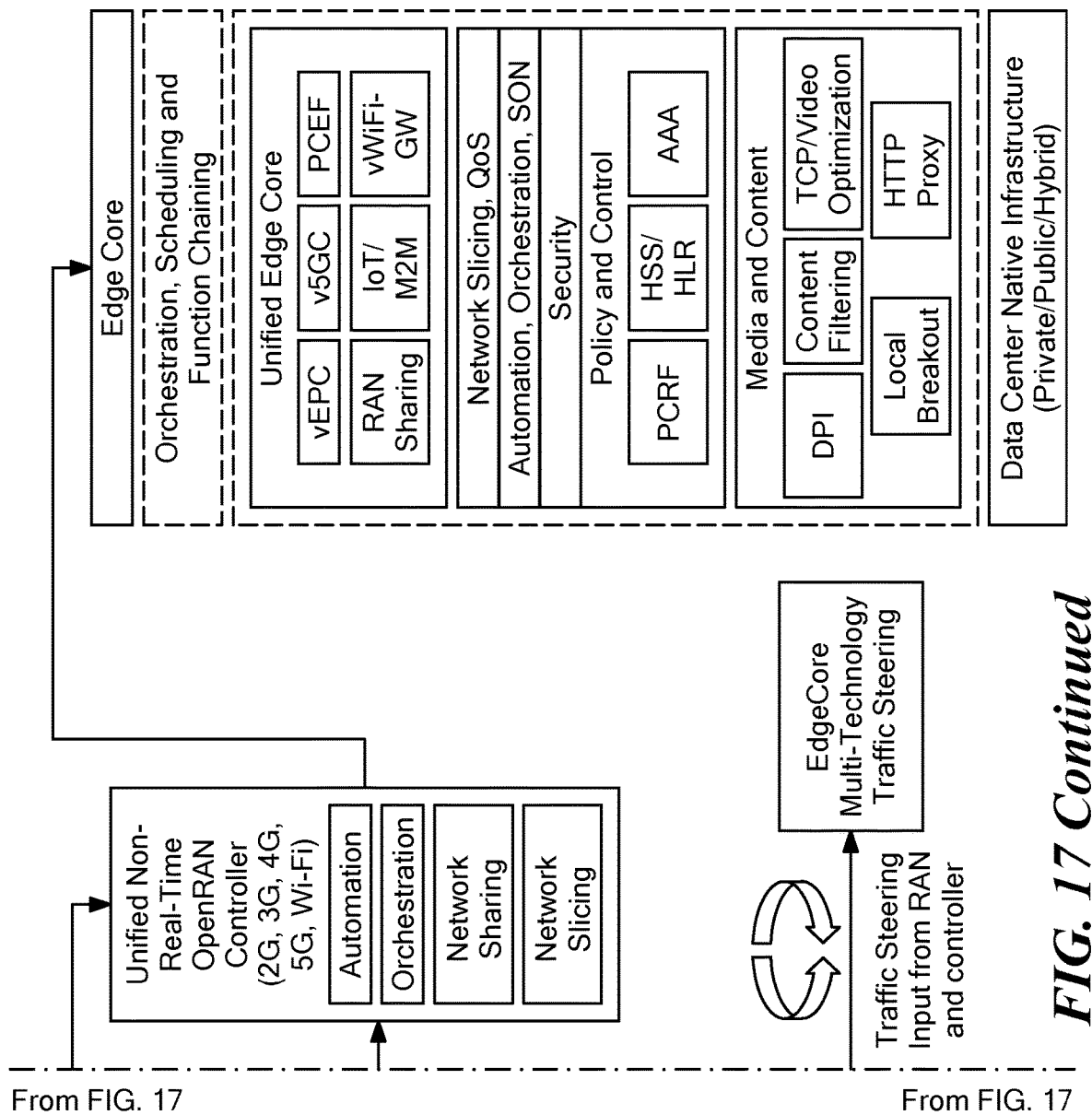

Service uniformity as subscribers roam across different radio access technologies Distributed edge intelligence for 2G, 3G, 4G, 5G and WiFi On Demand Local breakout for deployment flexibility and traffic steering Deployment Options:

FIG. 17 is a diagram showing an OpenRAN network infrastructure 1700.

Parallel Wireless Network Software is suitable for large-scale to small deployments.

The cloud-native software suite can be hosted on private, public or hybrid cloud.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access, or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing an Open Radio Access Network (RAN) networking infrastructure, comprising:
   providing real-time OpenRAN controller responsible for radio connection management, mobility management, QoS management, edge services, and interference management for the quality of end user experience;
   providing a non-real-time controller in communication with the real-time OpenRAN controller, the non-real-time controller providing functionality including configuration management, device management, fault management, performance management, and lifecycle management for all network elements in a network; and
   providing, by the non-real time controller, security and role based access control and RAN sharing.

2. The method of claim 1 further comprising consolidating, by the OpenRAN controller, different RAN functionalities reducing complexity and making overall network maintenance simpler and less resource intensive.

3. The method of claim 1 further comprising virtualizing, by the OpenRAN controller, vBSC/2G gateway, 3G gateway/vRNC, 4G gateway/X2 gateway, and Wi-Fi gateway.

4. The method of claim 1 further comprising supporting, by the OpenRAN controller, standard E2 interface and working with multi-vendor RA Ns.

5. The method of claim 1 further comprising providing, by the non-real time controller, network slicing.

6. A non-transitory computer-readable medium containing instructions for providing an Open Radio Access Network (RAN) networking infrastructure, which, when executed, cause a system to perform steps comprising:
   providing real-time OpenRAN controller responsible for radio connection management, mobility management, QoS management, edge services, and interference management for the quality of end user experience;
   providing a non-real-time controller in communication with the real-time OpenRAN controller, the non-real-time controller providing functionality including configuration management, device management, fault management, performance management, and lifecycle management for all network elements in a network; and
   providing, by the non-real time controller, security and role based access control and RAN sharing.

7. The computer-readable medium of claim 6 further comprising instructions for consolidating, by the OpenRAN controller, different RAN functionalities reducing complexity and making overall network maintenance simpler and less resource intensive.

8. The computer-readable medium of claim 6 further comprising instructions for virtualizing, by the OpenRAN controller, vBSC/2G gateway, 3G gateway/vRNC, 4G gateway/X2 gateway, and Wi-Fi gateway.

9. The computer-readable medium of claim 6 further comprising instructions for supporting, by the OpenRAN controller, standard E2 interface and working with multi-vendor RA Ns.

10. The computer-readable medium of claim 6 further comprising instructions for providing, by the non-real time controller, network slicing.

11. A system for providing an Open Radio Access Network (RAN) networking infrastructure, comprising:
    a real-time OpenRAN controller responsible for radio connection management, mobility management, QoS management, edge services, and interference management for the quality of end user experience;
    a non-real-time controller in communication with the real-time OpenRAN controller, the non-real-time controller providing functionality including configuration management, device management, fault management, performance management, and lifecycle management for all network elements in a network; and
    providing, by the non-real time controller, security and role based access control and RAN sharing.

12. The system of claim 11 wherein the OpenRAN controller consolidates different RAN functionalities reducing complexity and making overall network maintenance simpler and less resource intensive.

13. The system of claim 11 further wherein the OpenRAN controller virtualizes, vBSC/2G gateway, 3G gateway/vRNC, 4G gateway/X2 gateway, and Wi-Fi gateway.

14. The system of claim 11 wherein the OpenRAN controller supports standard E2 interface and working with multi-vendor RA Ns.

15. The system of claim 11 wherein the non-real time controller provides network slicing.

* * * * *